(12) United States Patent
Gold, Jr.

(10) Patent No.: US 10,078,719 B1
(45) Date of Patent: Sep. 18, 2018

(54) GENERATING PSEUDO-RANDOM CIRCUITS

(71) Applicant: Lockheed Martin Corporation, Bethesda, MD (US)

(72) Inventor: V. Edward Gold, Jr., Belle Isle, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/246,732

(22) Filed: Aug. 25, 2016

Related U.S. Application Data

(62) Division of application No. 14/553,319, filed on Nov. 25, 2014, now Pat. No. 9,449,135.

(51) Int. Cl.
*G06F 17/50* (2006.01)

(52) U.S. Cl.
CPC ...... *G06F 17/5072* (2013.01); *G06F 17/5081* (2013.01)

(58) Field of Classification Search
CPC .... G06F 15/17381; G06F 17/142; G06F 9/52; G06F 9/526; G06F 17/5045; G06F 17/5072; G06F 15/76; G06F 15/7867; G06F 15/80; G06F 15/8023; G06F 13/1673; G06F 13/28; G06F 13/4022; G06F 13/4027; G06F 13/4282; G06F 15/8038; G06F 9/44505; G06F 9/546; G09G 5/008; H05K 7/20836
USPC ................................................ 716/118–125
See application file for complete search history.

(56) References Cited

U.S. PATENT DOCUMENTS

| | | |
|---|---|---|
| 7,050,582 B1 | 5/2006 | Andreev et al. |
| 7,412,682 B2 | 8/2008 | Malhotra et al. |
| 9,449,135 B1 | 9/2016 | Gold, Jr. |
| 2002/0100007 A1 | 7/2002 | Teig et al. |
| 2010/0235804 A1* | 9/2010 | Ohtsuka .............. G06F 17/5077 716/137 |
| 2012/0240094 A1* | 9/2012 | Kumagai ............ G06F 17/5077 716/130 |

OTHER PUBLICATIONS

Author Unknown, "Hamiltonian Circuits and Paths," Presentation Slides, retrieved Jan. 30, 2015 from http://www.robeson.k12.nc.us/cms/lib6/NC01000307/Centricity/Domain/26413/Hamiltonian_Circuits_and_Paths.ppt, 26 pages.

(Continued)

Primary Examiner — Binh Tat
(74) Attorney, Agent, or Firm — Withrow & Terranova, PLLC

(57) ABSTRACT

Mechanisms for generating circuit paths are disclosed. A computing device obtains a nodal list that identifies a grid of nodes that is referenced to an area and that uniformly covers at least a portion of the area at a predetermined density. The computing device modifies the nodal list to identify a circuit path from a start node through a succession of neighbor nodes to an end node based on a waypoint list. For each of a plurality of iterations the computing device performs a bubble operation that includes identifying a first pair of nodes that are successive nodes in the circuit path and that are adjacent to a second pair of nodes out of the circuit path, and altering the circuit path to make the second pair of nodes part of the circuit path, such that the first pair of nodes are no longer successive nodes in the circuit path.

18 Claims, 26 Drawing Sheets

(56) References Cited

OTHER PUBLICATIONS

Boggess, Gene, "Chapter 9.5: Euler and Hamilton Paths," Presentation Slides, retrieved Jan. 30, 2015 from hittp://www.cis.temple.edu/~latecki/Courses/CIS166-Spring10/Lecturesich9.5.ppt, 18 pages.
Clisby, Nathan, "Hamiltonian path generator," Jul. 2012, 9 pages.
Clisby, Nathan, "Hamiltonian path generator," Jul. 2012, retrieved Jan. 21, 2015 from http://www.sfu.ca/~eemberly/phys847/assignments/hamiltonian_paths.html, 1 page.
Rubin, Frank, "A Search Procedure for Hamilton Paths and Circuits," Journal of the Association for Computing Machinery (JACM), vol. 21, Issue 4, Oct. 1974, ACM, 5 pages.
Non-Final Office Action for U.S. Appl. No. 14/553,319, dated Feb. 3, 2016, 10 pages.
Notice of Allowance for U.S. Appl. No. 14/553,319, dated May 25, 2016, 8 pages.
Non-Final Office Action for U.S. Appl. No. 14/553,483, dated Apr. 21, 2016, 5 pages.
Notice of Allowance for U.S. Appl. No. 14/553,483, dated Aug. 17, 2016, 7 pages.

\* cited by examiner

US 10,078,719 B1

GENERATING PSEUDO-RANDOM CIRCUITS

RELATED APPLICATIONS

This application is a divisional of co-pending U.S. patent application Ser. No. 14/553,319, filed on Nov. 25, 2014, entitled "GENERATING PSEUDO-RANDOM CIRCUITS," which is hereby incorporated herein by reference in its entirety.

TECHNICAL FIELD

The embodiments relate generally to circuits, and in particular to generating pseudo-random or random circuits.

BACKGROUND

Pseudo-random or random conductive circuits that cover a predetermined area of a surface of an item are useful in a variety of applications, such as protecting one or more components mounted on a printed circuit board from reverse engineering, or reducing electromagnetic interference. Typically, circuits are not truly random, and if the pattern of a circuit can be ascertained, then the circuit may be circumvented by an individual without damaging the circuit in order to obtain access to the underlying component or components. Often it is not desirable that the circuit completely cover the area, so that certain surface conditions, such as a particularly tall component or components, hot spots, or electromagnetic regions such as transmitters or receivers, can be accommodated. Designing a circuit that covers an area, but that must also contain openings, can be time-consuming and costly, and often results in circuits that are not truly random, reducing the circuits' effectiveness at preventing reverse engineering. Accordingly, there is a need for mechanisms, including systems, apparatuses, and methods, for quickly and efficiently generating pseudo-random or random circuits that cover a predetermined area of a surface of an item, and which can accommodate certain surface conditions of the item.

SUMMARY

The embodiments relate to the generation of a circuit design of a pseudo-random or random circuit that covers a predetermined area of an item, such as a printed circuit board. In some embodiments, the circuit contains openings, sometimes referred to as node-free zones, that accommodate one or more surface conditions of the item. In operation the circuit covers the item, and a short or breach of the circuit can be detected. Upon detection, actions can be taken with respect to the item. For example, upon detection of a short or breach of the circuit, electrical power to the item may be halted.

In one embodiment a method for generating a nodal list is provided. A computing device obtains data that identifies a perimeter of an area of a surface. At least one sub-area within the area is identified. The computing device generates a nodal list that identifies a grid of nodes that is referenced to the area and uniformly covers the area outside of the at least one sub-area at a predetermined density. The grid of nodes comprises a node-free zone that is coextensive with the at least one sub-area. For each respective node, the nodal list identifies each neighbor node of the respective node.

In one embodiment the at least one sub-area corresponds to a component on the surface or a thermal hot-spot of the surface.

In another embodiment a method for generating a circuit path is provided. A computing device obtains a nodal list that identifies a grid of nodes that is referenced to an area and that uniformly covers at least a portion of the area at a predetermined density. For each respective node, the nodal list identifies each neighbor node of the respective node. The computing device modifies the nodal list to identify a circuit path through the grid of nodes from a start node through a succession of neighbor nodes to an end node based on a waypoint list that identifies a plurality of nodes in the grid of nodes through which the circuit path is to traverse. For each of a plurality of iterations the computing device performs a bubble operation that includes identifying a first pair of nodes that are successive nodes in the circuit path and that are adjacent to a second pair of nodes out of the circuit path, and altering the circuit path to make the second pair of nodes part of the circuit path, such that the first pair of nodes are no longer successive nodes in the circuit path.

In one embodiment the bubble operation is iteratively repeated until no pair of nodes that are successive nodes in the circuit path are adjacent to another pair of nodes out of the circuit path.

In one embodiment, a nudging operation is performed by analyzing the nodal list to determine an orphan node that is not in the circuit path, determining that a second node that is cater-corner to the orphan node in the grid of nodes is in the circuit path and that the second node is connected via the circuit path to two neighbor nodes of the orphan node, and altering the circuit path to remove the second node from the circuit path and to include the orphan node in the circuit path.

In one embodiment the computing device may iteratively perform bubble processing and nudge processing.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first node" and "second node," and does not imply a priority, a type, an importance, or other attribute, unless otherwise stated herein. The term "about" used herein in conjunction with a numeric value means any value that is within a range of ten percent greater than or ten percent less than the numeric value.

The embodiments relate to the generation of a circuit design of a pseudo-random or random circuit that covers a predetermined area of an item, such as a printed circuit board. In some embodiments, the circuit contains openings, sometimes referred to as node-free zones, that accommodate one or more surface conditions of the item. In operation the circuit covers the item, and a short or breach of the circuit can be detected. Upon detection, actions can be taken with respect to the item. For example, upon detection of a short or breach of the circuit, electrical power to the item may be halted.

Figure 1:
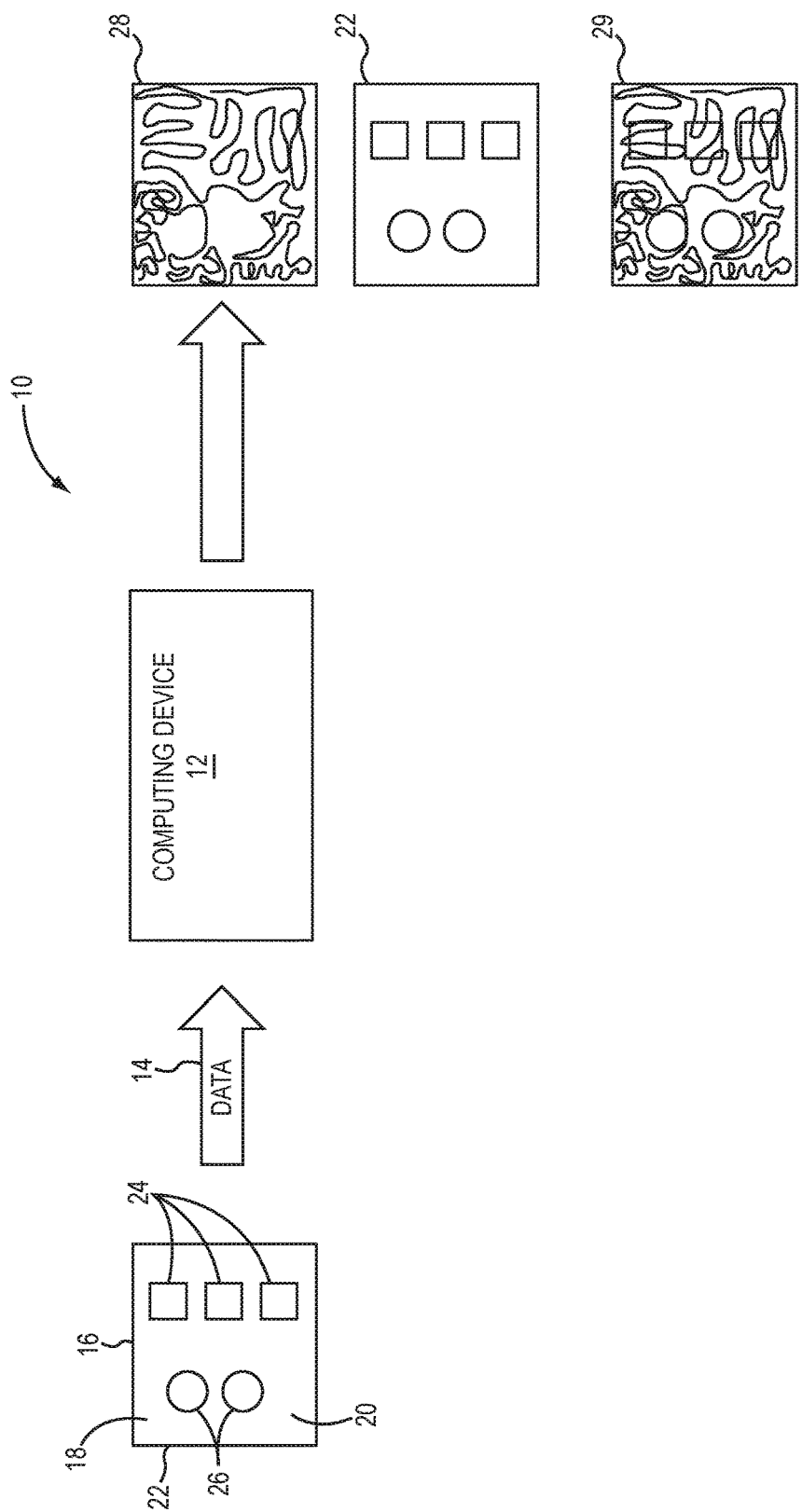
FIG. 1 is a block diagram of a system in which embodiments can be practiced according to one embodiment.

FIG. 1 is a block diagram of a system 10 in which embodiments can be practiced according to one embodiment. The system 10 includes a computing device 12. The computing device 12 receives data 14 that identifies a perimeter 16 of an area 18 of a surface 20 of an item 22. The item 22 may comprise any desired thing, but in one embodiment the item 22 comprises a printed circuit board upon which one or more electronic components 24 are mounted. The data 14 may comprise any suitable form, and can include, by way of non-limiting example, an image of the surface area, a data file that describes the surface area, such as a Drawing Interchange Format (DXF) file, or a vector file, or, in some embodiments, the data 14 may at least in part be entered by a user. In some embodiments, one or more sub-areas 26 that are within the area 18 may be identified in the data 14. The sub-areas 26 may identify surface conditions of the item 22 that contain certain features, such as a particularly tall component, a component that receives or transmits electromagnetic radiation, or a thermal hotspot of the item 22.

The computing device 12 receives the data 14 and generates, as described in greater detail below, a nodal list of a grid of nodes that is referenced to the area 18. The computing device 12 then, utilizing the nodal list, defines a pseudo-random circuit path through the grid of nodes. The nodal list can be utilized to generate a conductive circuit 28. The conductive circuit 28 has a random or pseudo-random pattern. The conductive circuit 28 can be adhered or otherwise fixed with respect to the item 22 to form an assembly 29 that comprises the conductive circuit 28 and the item 22. The assembly 29 may include circuitry that is coupled to the conductive circuit 28 and that can detect a short or a breach of the conductive circuit 28. Upon detection, the circuitry may take one or more desired actions, including, for example, halting power to the item 22.

Figure 2:
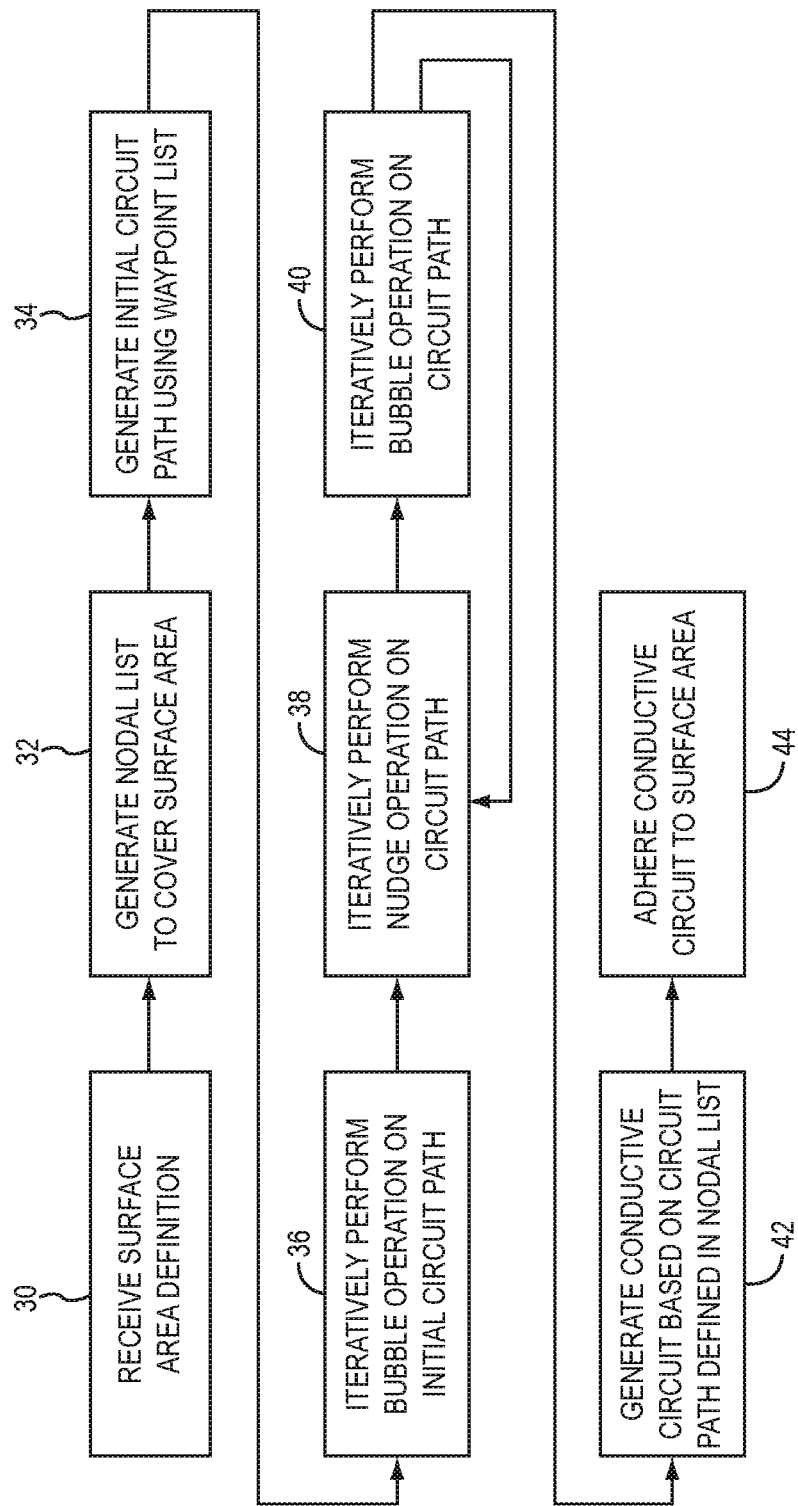
FIG. 2 is a flowchart of a method for generating a circuit.

FIG. 2 is a flowchart of a method for generating a circuit in greater detail than that discussed above with regard to FIG. 1. FIG. 2 will be discussed in conjunction with FIG. 1. Initially, the computing device 12 receives a surface area definition, in the form of the data 14, that identifies the surface area 18 of the item 22 (FIG. 2, block 30). The computing device 12 generates a nodal list that defines a grid of nodes that covers the surface area 18 (FIG. 2, block 32). A detailed discussion of the generation of an example nodal list is discussed below. An initial circuit path is generated through the nodal list using a waypoint list (FIG. 2, block 34). A detailed discussion of the generation of an example initial circuit path is also presented below. A bubble operation is iteratively performed on the circuit path (FIG. 2, block 36). As will be discussed in greater detail below, the bubble operation randomly alters the circuit path based on certain conditions of the nodes in the nodal list. In some embodiments, the bubble operation is iteratively performed until no nodes in the nodal list meet the conditions necessary for a bubble operation to be performed.

After bubble operation processing is finished, one or more orphan nodes that are not connected to the circuit path may exist. The computing device 12 iteratively performs a nudge operation to bring at least some of the orphan nodes into the circuit path (FIG. 2, block 38). After completion of nudge operation processing, at least some nodes in the nodal list may again meet the conditions necessary for a bubble operation. The computing device 12 may again perform the bubble operation iteratively until no nodes in the nodal list meet the conditions necessary for a bubble operation (FIG. 2, block 40). Blocks 38 (nudge operation processing) and 40 (bubble operation processing) may be successively performed one or more times. After completion, a circuit path is defined in the nodal list. The computing device 12, or another device, may generate the conductive circuit 28 based on the circuit path defined in the nodal list (FIG. 2, block 42). The conductive circuit 28 may then be adhered to the surface area 18 (FIG. 2, block 44).

Figure 3:
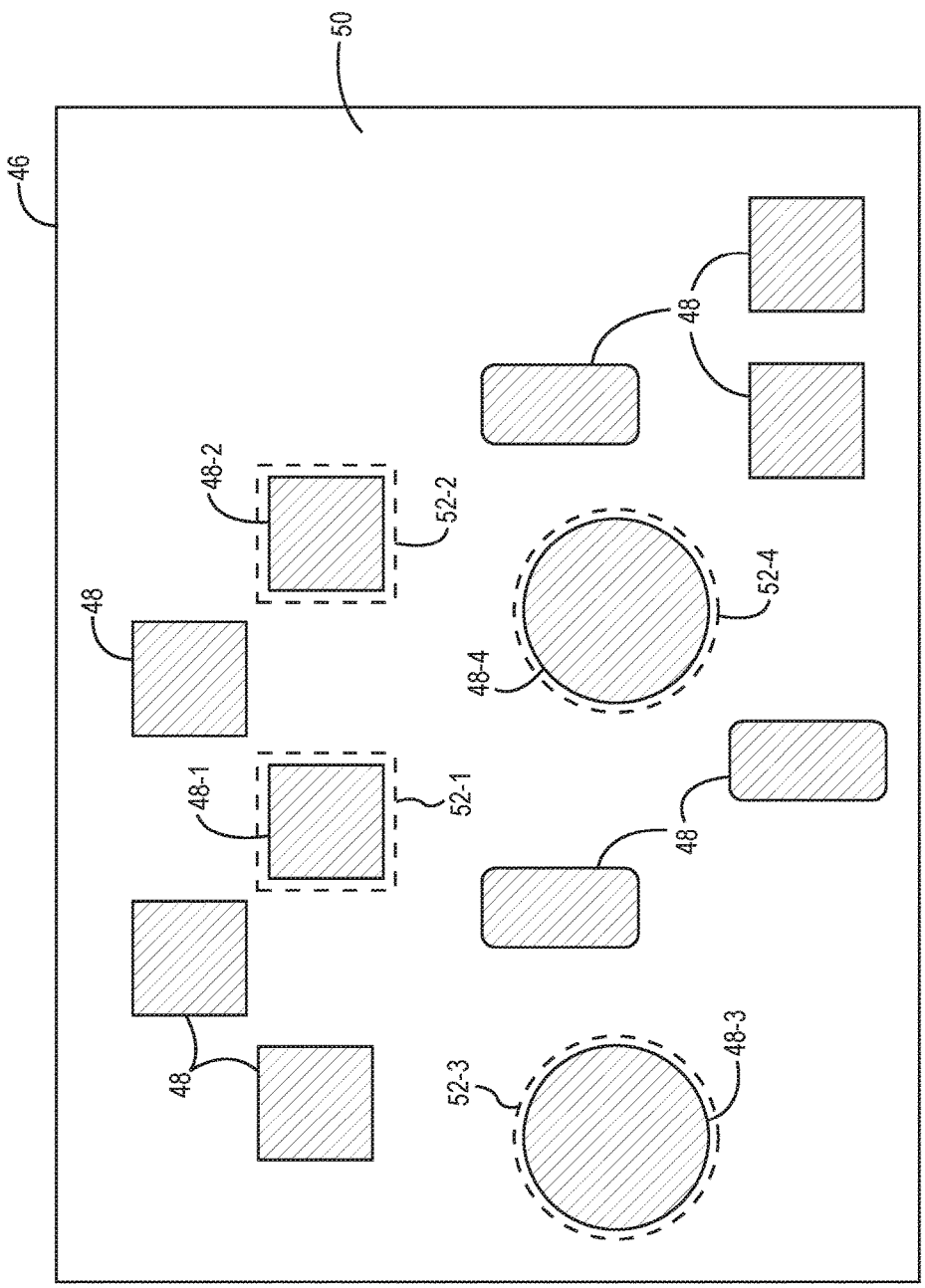
FIG. 3 is a block diagram of an example item.

FIG. 3 is a block diagram of an example item 46 and will be discussed in conjunction with FIGS. 4 and 5 to illustrate the generation of a nodal list according to one embodiment. The item 46 is a printed circuit board that includes a plurality of components 48, and components 48-1-48-4 (generally, components 48) mounted with respect to a surface 50 of the item 46. The components 48-1 and 48-2 comprise a receiver and a transmitter, respectively, and accordingly, it is undesirable to place an electronic circuit over the components 48-1 and 48-2. Accordingly, sub-areas 52-1 and 52-2 identify surface conditions of the surface 50 over which it is not desired to place an electronic circuit. The components 48-3 and 48-4 have a relatively substantial height and extend relatively far above the other components 48. Adhering an electronic circuit on top of the components 48-3, 48-4, which also covers the remainder of the components 48 may be difficult, and thus sub-areas 52-3 and 52-4 also identify surface conditions of the surface 50 over which it is not desired to place an electronic circuit. While not illustrated, other such surface conditions may comprise, for example, thermal hotspots that exist on the surface 50, and over which it may be undesirable to place an electronic circuit. The perimeter of an area of the surface 50 of the item 46, and information that identifies the sub-areas 52-1-52-4, are provided to the computing device 12 (FIG. 1). The information may be provided via user input, or may be contained in a file or other electronic medium accessible by the computing device 12.

The computing device 12 uses the information to generate a nodal list that identifies a grid of nodes that is referenced to the area of the surface 50 and that uniformly covers the area of the surface 50 outside of the sub-areas 52-1-52-4 at a predetermined resolution, or density. Any desired density may be used, but higher density may make it more difficult to circumvent the resultant electronic circuit. By way of non-limiting example, the nodes may be placed 6 microns apart from one another, to facilitate 3 micron wide electronic traces.

Figure 4:
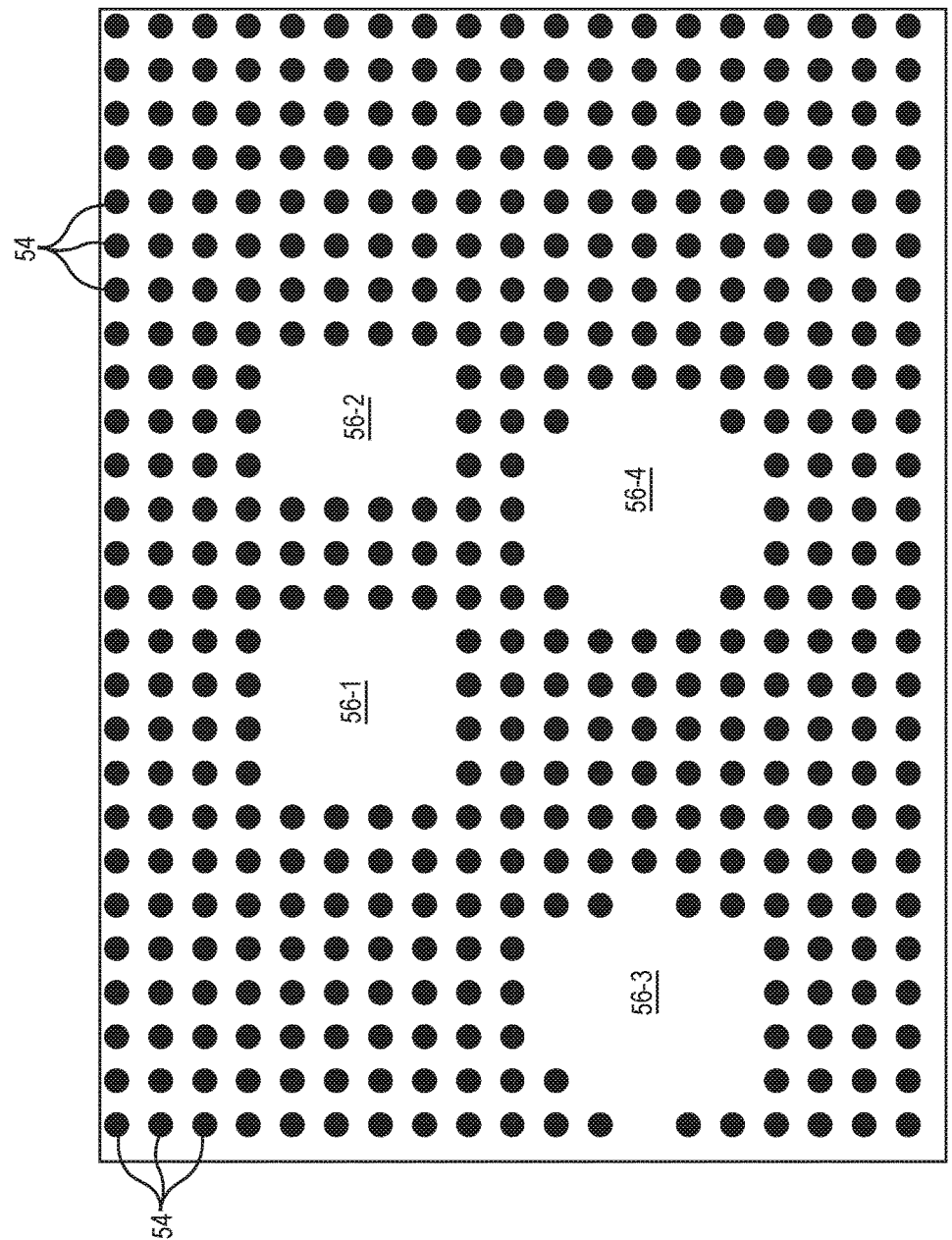
FIG. 4 is a block diagram of a representation of a grid of nodes identified in a nodal list.

FIG. 4 is a block diagram of a representation of a grid of nodes 54 identified in a nodal list that is generated based on the information discussed above with regard to the item 46. Note that for purposes of illustration the grid of nodes 54 is not substantially dense, and in practice, the density would likely be substantially higher. Note also that the grid of nodes 54 includes node-free zones 56-1-56-4 which correspond, respectively, to sub-areas 52-1-52-4. The node-free zones 56-1-56-4 ensure that the circuit path, as discussed in greater detail herein, does not extend into the node-free zones 56-1-56-4.

Figure 5:
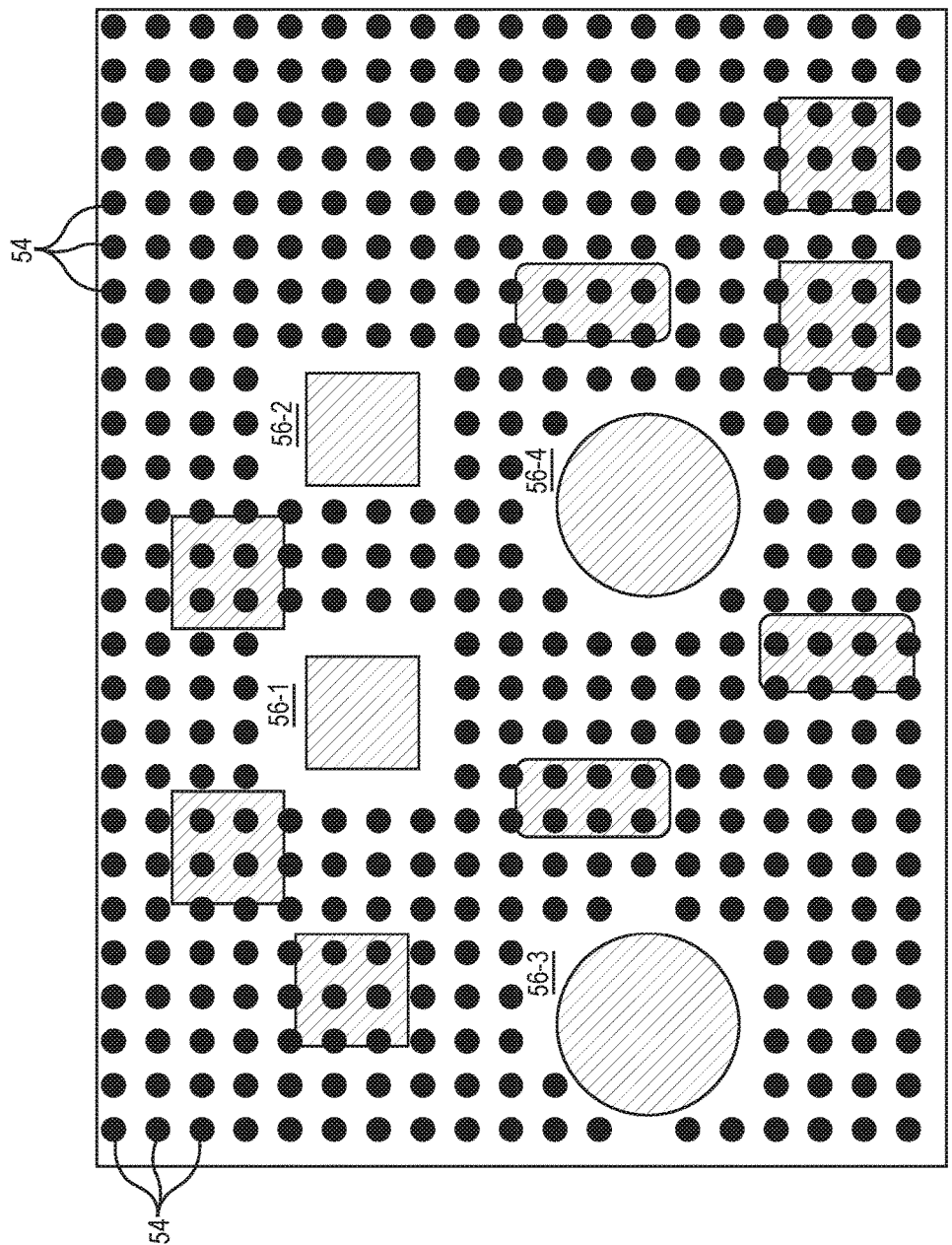
FIG. 5 is a block diagram illustrating the grid of nodes illustrated in FIG. 4 overlaid on top of the item illustrated in FIG. 3.

FIG. 5 is a block diagram illustrating the grid of nodes 54 illustrated in FIG. 4 overlaid on top of the item 46 illustrated in FIG. 3. Note that the node-free zones 56-1-56-4 of the grid of nodes 54 align with the sub-areas 52-1-52-4 of the surface 50.

Figure 6:
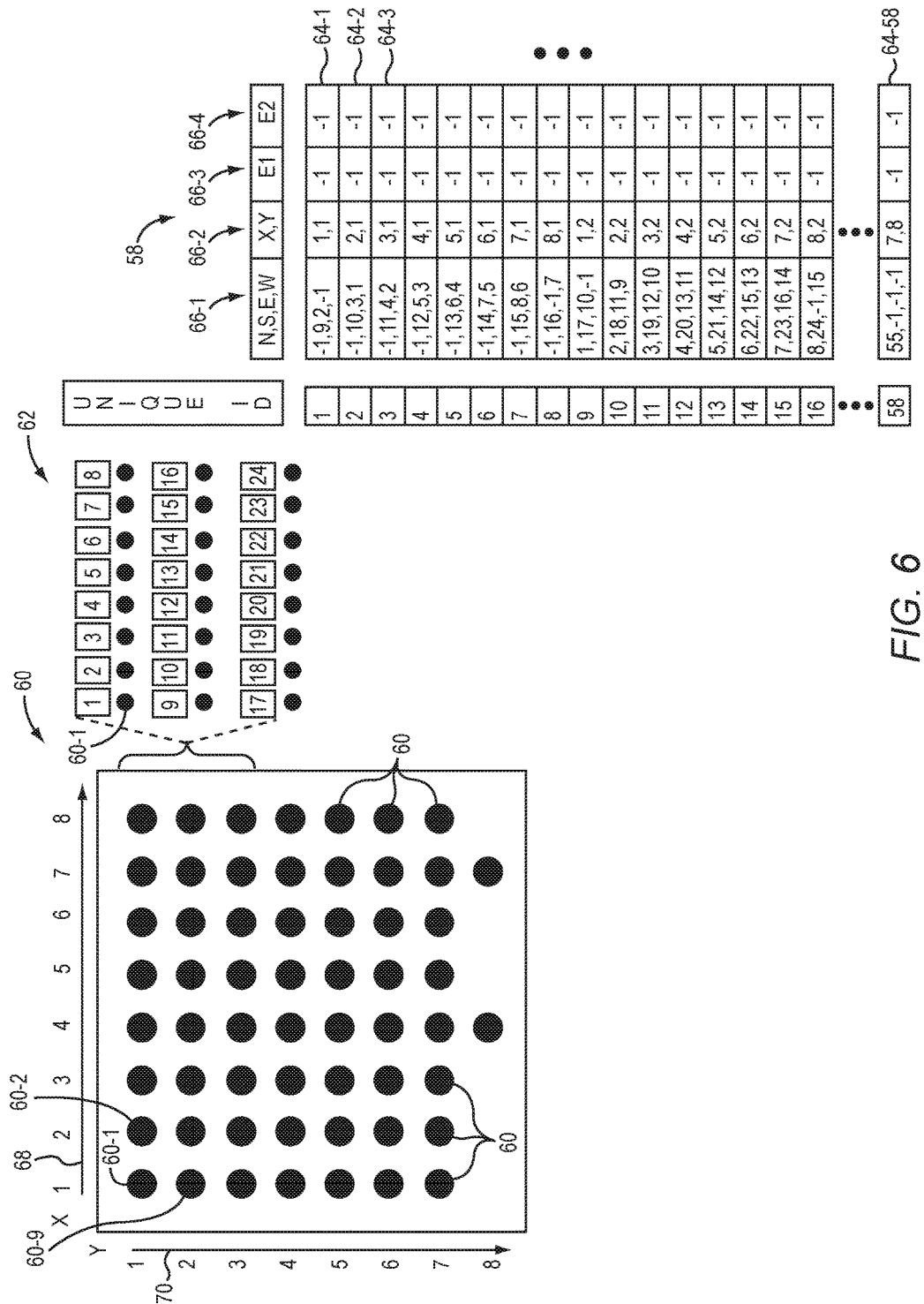
FIG. 6 is a block diagram illustrating a nodal list that identifies a grid of nodes according to one embodiment.

FIG. 6 is a block diagram illustrating a nodal list 58 that identifies a grid of nodes 60 according to one embodiment. Each node 60 identified in the nodal list 58 may have a unique identifier (UID) 62. For purposes of illustration, the first three rows of the grid of nodes 60 are illustrated with corresponding UIDs 62 placed in proximity of the corresponding node 60. In this embodiment, UIDs 62 have been provided based on a right to left, top to bottom sequence of the nodes 60, but the embodiments are not limited to any particular mechanism for providing unique identifiers.

The nodal list 58 maintains information about each node 60 identified in the nodal list 58. The information, for purposes of illustration, is illustrated as rows 64-1-64-58 (generally, rows 64) of the nodal list 58. The grid of nodes 60 contains fifty-eight nodes, and thus, the nodal list 58 comprises fifty-eight rows 64. Each row 64 contains one or more data fields 66-1-66-4 of information that identify information about the corresponding node. In particular, the data field 66-1 of the nodal list 58 identifies the UID 62 of each neighbor node 60 of the respective node 60. A neighbor node 60 is an immediately adjacent node 60 in the grid of nodes 60. For example, with reference to the UIDs 62, node 60-1 having the UID 62 value 1 has two neighbor nodes 60, a node 60-2 having the UID 62 value 2 and a node 60-9 having the UID 62 value 9. For purposes of illustration, the direction of one node with respect to another may be referred to herein as north (up), south (down), east (right) and west (left). Thus, the node 60-1 is west of the node 60-2 and north of the node 60-9. This is illustrated in the data field 66-1 of the row 64-1 that identifies the node 60-1. Data field 66-1 identifies the neighbor node 60 that is north of the node 60-1 as "−1," which is a predetermined value utilized to indicate the absence of a node 60. Thus, the node 60-1 has no north neighbor. The neighbor node 60 that is south of the node 60-1 is identified by the UID 62 value 9 (node 60-9), the neighbor node 60 that is east of the node 60-1 is identified by the UID 62 value 2 (node 60-2), and the neighbor node 60 that is west of the node 60-1 is identified by the value "−1" because the node 60-1 has no west neighbor.

In one embodiment, the location of each node 60 with respect to an X-axis 68 and Y-axis 70 may be maintained in a data field 66-2 of each row 64. Data fields 66-3, 66-4 identify neighbor nodes 60 to which the node 60 has an "edge," sometimes referred to herein as a connection. Edges are utilized to define a circuit path through the grid of nodes 60, which comprises a succession of nodes 60 that are connected to one another. When the nodal list 58 is initially generated, the data fields 66-3, 66-4 may be initialized to a value of "−1," or some other predetermined value, to indicate that the nodes 60 are unconnected to one another.

The UIDs 62 of each node 60 may also be maintained in the row 64 of the corresponding node 60, or, the UIDs 62 may be maintained through an inherent position of the respective row 64 in the nodal list 58. For example, the node 60 having the UID 62 value 1 may be the first entry in the nodal list 58, and the node 60 having the UID 62 value 2 may be the second entry in the nodal list 58, etc.

Figure 7:
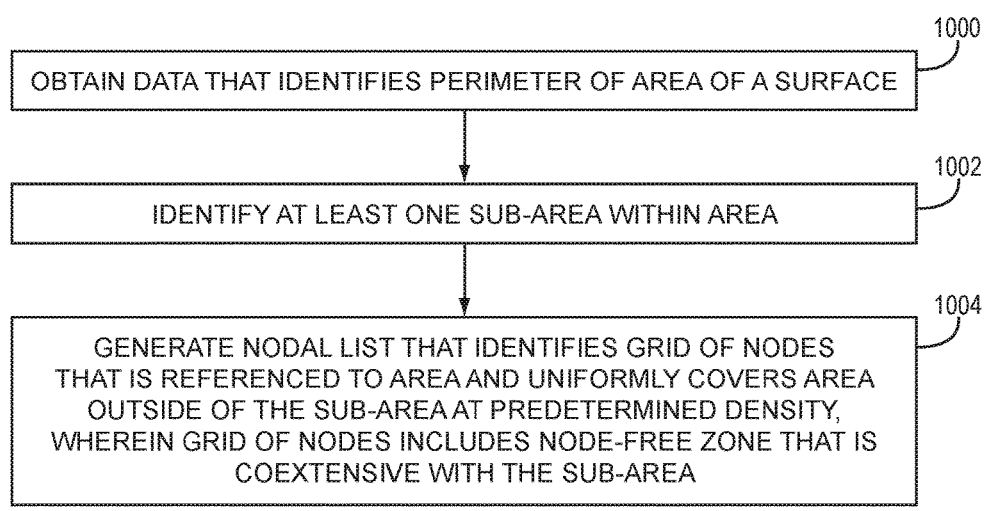
FIG. 7 is a flowchart of a method for generating a nodal list according to one embodiment.

FIG. 7 is a flowchart of a method for generating a nodal list according to one embodiment, and will be discussed in conjunction with FIG. 1. The computing device 12 receives the data 14 that identifies the perimeter 16 of the area 18 of the surface 20 of the item 22 (FIG. 7, block 1000). While for purposes of illustration, the perimeter 16 is illustrated as having a rectangular shape, the embodiments are not limited to any particular shapes, and can be utilized to generate nodal lists for any perimeter shape.

The computing device 12 identifies at least one sub-area 26 within the area 18 (FIG. 7, block 1002). As discussed above, the at least one sub-area 26 may be identified based on information contained in the data 14. The at least one sub-area 26 may correspond, for example, to a component on the surface 20 or a thermal hot-spot of the surface 20.

The computing device 12 generates a nodal list that identifies a grid of nodes that is referenced to the area 18 and that uniformly covers the area 18 outside of the at least one sub-area 26 at a predetermined density, such that the grid of nodes comprises a node-free zone that is coextensive with the at least one sub-area 26 (FIG. 7, block 1004). For each respective node, the nodal list identifies each neighbor node of the respective node.

Figure 8:
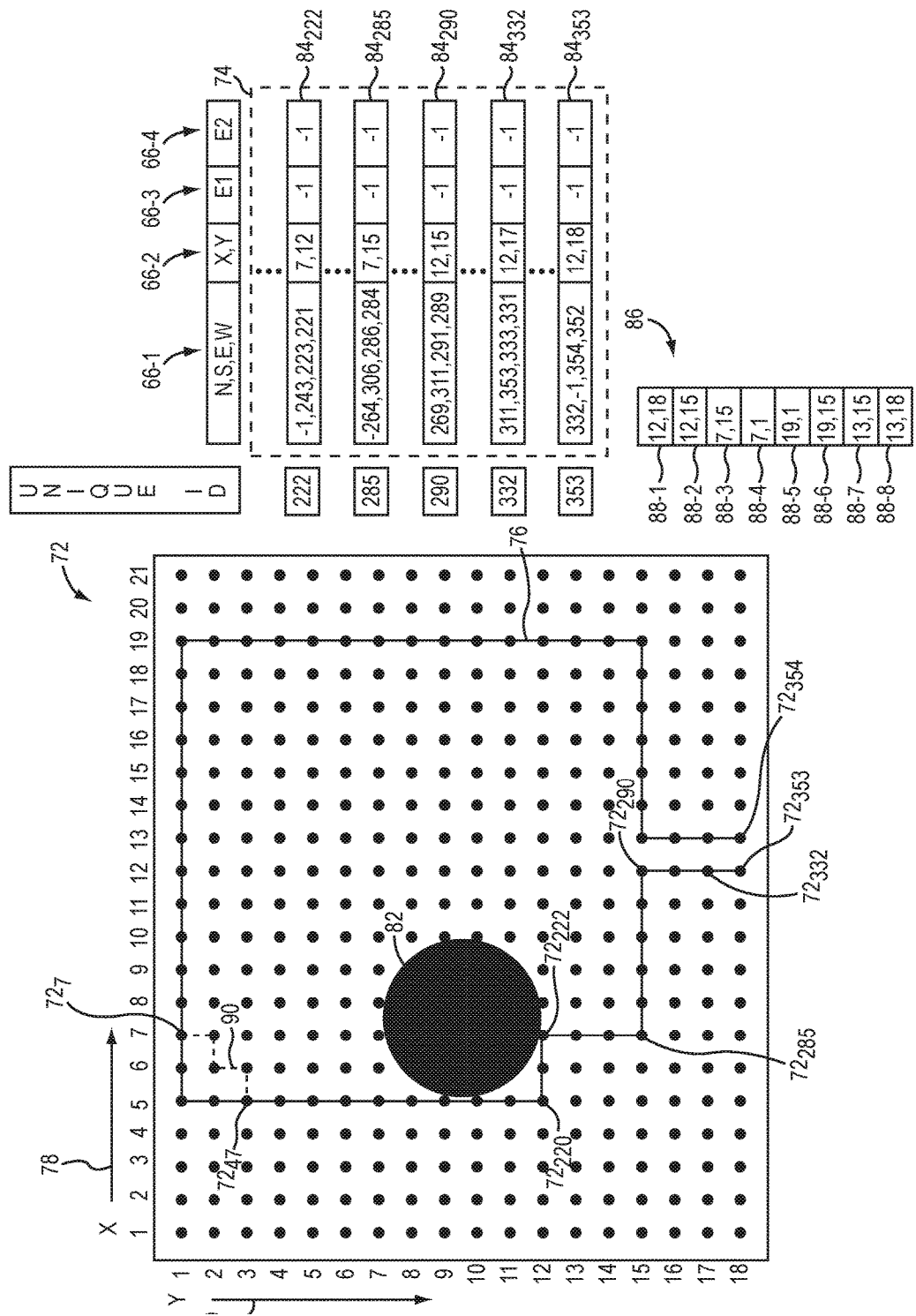
FIG. 8 is a block diagram of a representation of a grid of nodes identified in a nodal list that has the same, or substantially similar, data field layout to that discussed above with regard to the nodal list of FIG. 6.

FIG. 8 is a block diagram of a representation of a grid of nodes 72 identified in a nodal list 74 that has the same, or substantially similar, data field layout to that discussed above with regard to the nodal list 58 of FIG. 6. FIG. 8 will be discussed with reference to the modification of the nodal list 74 to identify a circuit path 76 through the grid of nodes 72. For purposes of illustration, the grid of nodes 72 has been labeled with an X-axis 78 and Y-axis 80 that have a 1,1 origin at the top left corner of the grid of nodes 72. A node-free zone 82 is identified in the nodal list 74 that encompasses the area of 16 nodes. The nodal list 74 thus has 362 entries (21 columns*18 rows−16 nodes in node-free zone 82) because the grid of nodes 72 contains 362 nodes 72, but for purposes of illustration, only entries 84222, 84285, 84290, and 84353 (generally, entries 84) are illustrated. For purposes of illustration, individual nodes 72 will be referenced herein with a subscript that corresponds to the UID of the respective node 72. Similarly, entries 84 include the subscript of the node 72 to which the entry 84 corresponds. Thus, entry 84222 corresponds to node 72222, entry 84285 corresponds to node 72285, entry 84290 corresponds to node 72290, and entry 84353 corresponds to node 72353.

The computing device 12 receives a waypoint list 86 that identifies a start node 72 through a succession of neighbor nodes 72 to an end node 72 through the grid of nodes 72 which the circuit path 76 is to traverse. In one embodiment, the waypoint list 86 comprises a plurality of entries 88-1-88-N (generally, entries 88), each entry 88 identifying a particular node 72. The start and end nodes 72 may be identified in any desired manner. In one embodiment, the first node 72 identified in the waypoint list 86 comprises the start node 72, and the last node 72 identified in the waypoint list 86 comprises the end node 72. Each successive node 72 identified in the waypoint list 86 after the start node 72 identifies nodes 72 that the circuit path 76 is to traverse, and identifies the particular order of traversal. While for purposes of illustration the entries 88 identify the nodes 72 by X,Y coordinates, it will be apparent that the entries 88 could identify the nodes 72 in any desired manner, such as by UIDs, or by locations on the surface 20 of the item 22. If the nodes 72 are identified by locations on the surface 20 of the item 22, the computing device 12 may determine the closest nodes 72 that correspond to the identified locations.

The first entry 88-1 of the waypoint list 86 identifies the node 72353 at location X=12 and Y=18 as the start node. The entry 88-2 identifies the node 72290 as the next node 72 on the waypoint list 86. The computing device 12 generates the circuit path 76 iteratively by altering the data fields 66-3, 66-4 of respective entries 84 of the waypoint list 86 to identify edges, or connections, between the respective nodes 72. The computing device 12 makes determinations with respect to a most recent node 72 made part of the circuit path 76 and the next node 72 that is identified on the waypoint list 86 but that is not yet part of the circuit path 76. At the beginning, the first node that will be entered on the circuit path 76 is the start node 72353, and the next node 72 that is identified on the waypoint list 86 but that is not yet part of the circuit path 76 is the node 72290. The computing device 12 makes a determination of a preferred direction and a secondary direction based on the X,Y coordinates of the nodes 72353 and 72290. In particular, computing device 12 determines the absolute (irrespective of a positive or negative value) distance between the nodes 72353 and 72290 in terms of the X direction and the Y direction. The longer distance is set as the preferred direction and the shorter distance as the secondary direction. In this example, the node 72290 has X,Y coordinates of 12, 15 and the node 72353 has X,Y coordinates of 12, 18. The calculation for the X direction is 12−12=0, and for the Y direction is 15−18=−3. Thus the Y direction is the preferred direction and the X direction is the secondary direction. Because the Y value is negative, the computing device 12 will attempt to build the circuit path 76 in a north (upward) direction.

The computing device 12 determines that the node 72332 at X,Y coordinates 12, 17 is unconnected to any other nodes 72, and thus makes the node 72332 the next node 72 in the circuit path 76. The computing device 12 makes this determination by analyzing the data fields 66-3, 66-4 of the corresponding entry 84332 of the node 72332 in the nodal list 74. Because the data fields 66-3, 66-4 of the entry 84332 have a value of −1, the node 72332 is not currently connected to any other node 72 and can be made part of the circuit path 76. The computing device 12 alters the data field 66-4 of the entry 84353 to have a value of 332 to show that the node 72353 is connected to the node 72332, and alters the data field 66-3 of the entry 84332 to have a value of 353. The computing device 12 then repeats the determination of a preferred direction and a secondary direction based on the X,Y coordinates of the node 72332 and the X,Y coordinates of the node 72290.

The computing device 12 iteratively continues this process and the circuit path 76 will grow as illustrated in FIG. 8. At node 72222, the next node 72 identified in the waypoint list 86 is the node 727. The computing device 12 determines that the Y direction (north) is the preferred direction. However, the data field 66-1 of the entry 84222 indicates that the node 72222 has no north neighbor. This is due to the node-free zone 82. The computing device 12 then selects the secondary direction, east/west, and arbitrarily chooses west, since the node 72222 has the same X coordinate as the node 727. The computing device 12 continues to add nodes 72 to the circuit path 76 until a node 72, in this example the node 72220, allows the circuit path 76 to continue in a north direction.

In one embodiment, it may be desirable to reduce or eliminate zig-zag path segments, such as is illustrated by the dashed line segments 90, which may otherwise happen when the X and Y distances between the current node 72 and the next node 72 in the waypoint list 86 fall within +1 or −1 of one another. In one embodiment, the computing device 12 maintains a previous direction indicator that indicates the last direction of the circuit path 76. After determination of the preferred direction and the secondary direction, and so long as neither distance is zero, the computing device 12 determines if the secondary direction is the same as the previous direction. If so, then the computing device 12 sets the secondary direction as the preferred direction and continues to build the circuit path 76 in the same direction as the previous direction. However, to prevent "overshooting" the next node 72 on the waypoint list 86, if either distance is zero, then the computing device chooses the preferred direction irrespective of the previous direction.

The computing device 12 continues this process until the circuit path 76 ends at the node 72354, the final node 72 identified in entry 88-8 of the waypoint list 86. The circuit path 76 is identified in the nodal list 74 via the data fields 66-3, 66-4.

Figure 9:
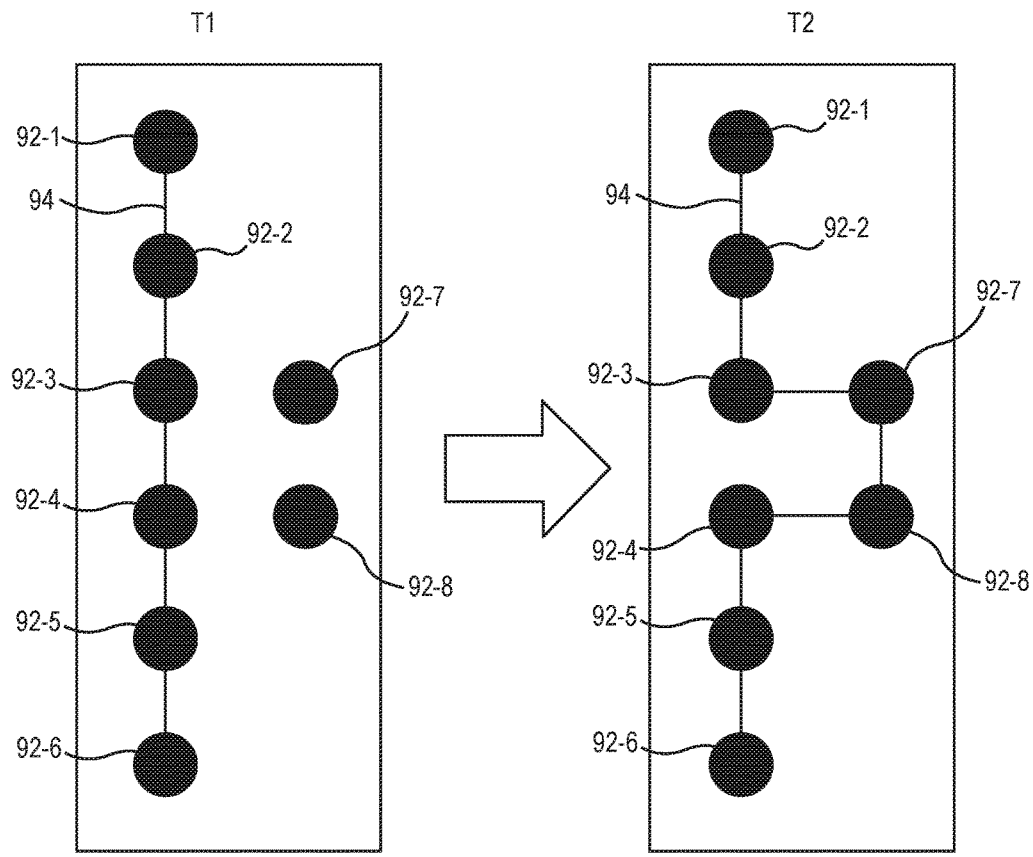
FIG. 9 is a block diagram of a subset of nodes through which a circuit path extends, and which will be used to explain a bubble operation according to one embodiment.

After the circuit path 76 is generated, the computing device 12, for a plurality of iterations, performs a bubble operation on the circuit path 76 to modify the circuit path 76 to encompass all, or substantially all, of the remaining nodes 72 in a pseudo-random, or random, manner. FIG. 9 is a block diagram of a subset of nodes 92 through which a circuit path 94 extends, and which will be used to explain the bubble operation. Assume that a nodal list (not illustrated) identifies the nodes 92-1-92-6 as part of the circuit path 94, and identifies nodes 92-7-92-8 as not being part of the circuit path 94. The computing device 12 examines the nodal list to identify a first pair of nodes 92 that are successive nodes in the circuit path 94 and that are adjacent to a second pair of nodes 92 that are out of the circuit path 94. Successive nodes 92 are nodes 92 that are immediately adjacent to one another in the circuit path 94, and may be determined by the computing device 12 by analyzing the data fields 66 (FIG. 8) of the nodal list.

In this example, the computing device 12 determines, at a time T1, that the nodes 92-3 and 92-4 are successive nodes in the circuit path 94 and are adjacent to a second pair of nodes 92-7 and 92-8 that are out of the circuit path 94. Again, the computing device 12 can determine that the nodes 92-7 and 92-8 are out of the circuit path 94 and are adjacent to the nodes 92-3 and 92-4 by analyzing the data fields 66 of the nodal list.

The computing device 12 then alters the circuit path 94, at a time T2, to make the second pair of nodes 92-7, 92-8 part of the circuit path 94, such that the first pair of nodes 92-3, 92-4 are no longer successive nodes 92 in the circuit path 94. This process may be iteratively repeated until no pairs of nodes 92 that are successive nodes 92 in the circuit path 94 are adjacent to a second pair of nodes 92 out of the circuit path 94.

Figure 10B:
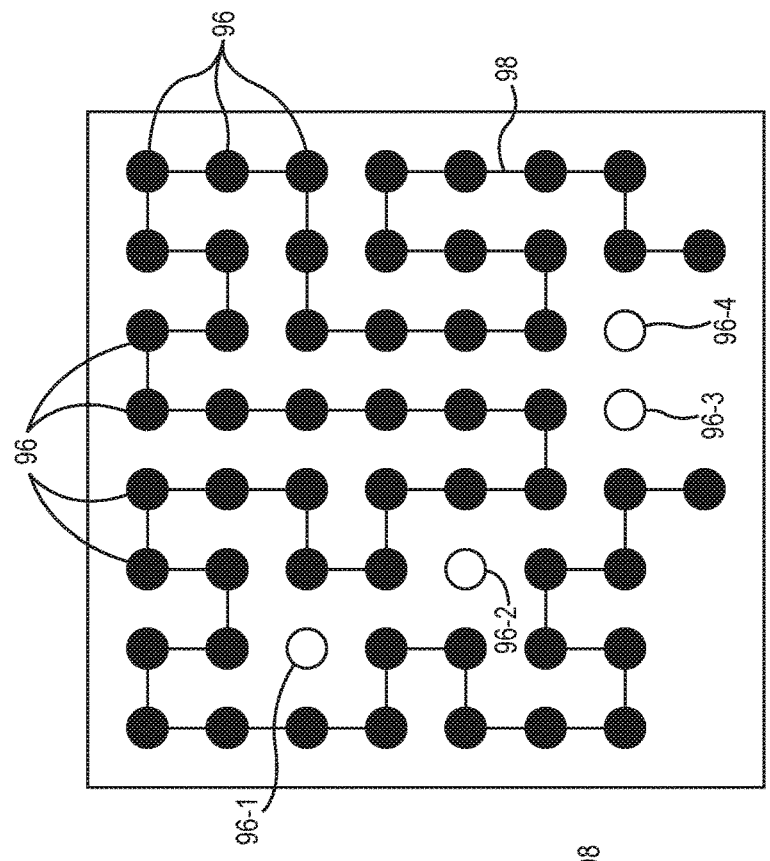
FIG. 10B is a block diagram of the circuit path illustrated in FIG. 10A at a subsequent point in time after a computing device has iteratively performed the bubble operation on the circuit path until no pairs of nodes that are successive nodes in the circuit path are adjacent to a second pair of nodes out of the circuit path.
Figure 10A:
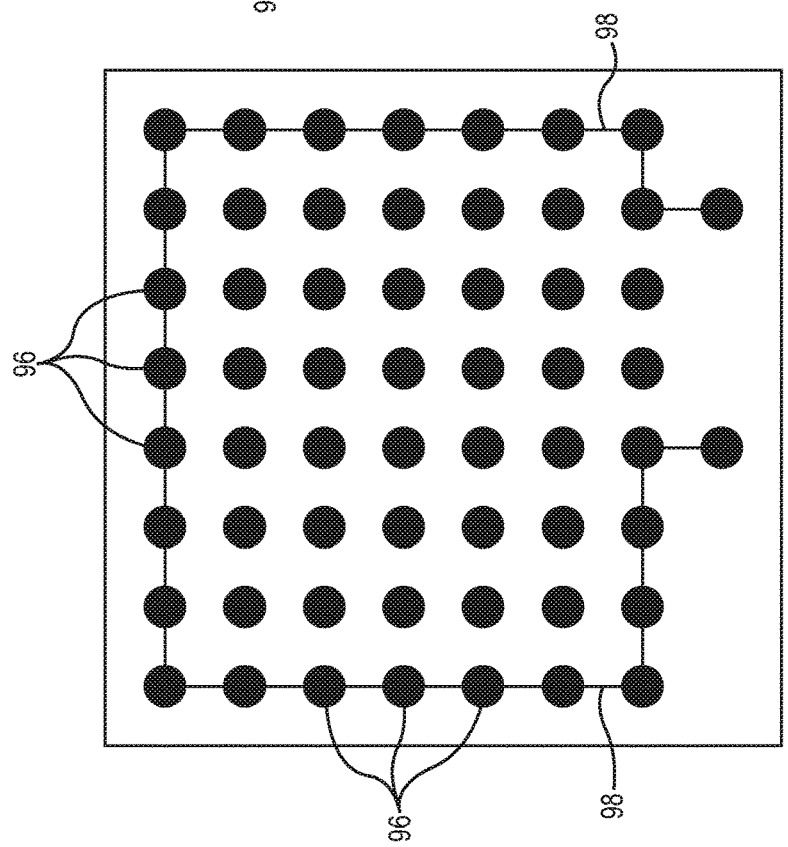
FIG. 10A is a block diagram of another grid of nodes through which an initial circuit path has been defined.

FIG. 10A is a block diagram of another grid of nodes 96 through which an initial circuit path 98 has been defined. FIG. 10B is a block diagram of the circuit path 98 at a subsequent point in time after the computing device 12 has iteratively performed the bubble operation on the circuit path 98 until no pairs of nodes 96 that are successive nodes 96 in the circuit path 98 are adjacent to a second pair of nodes 96 out of the circuit path 98.

Figure 11:
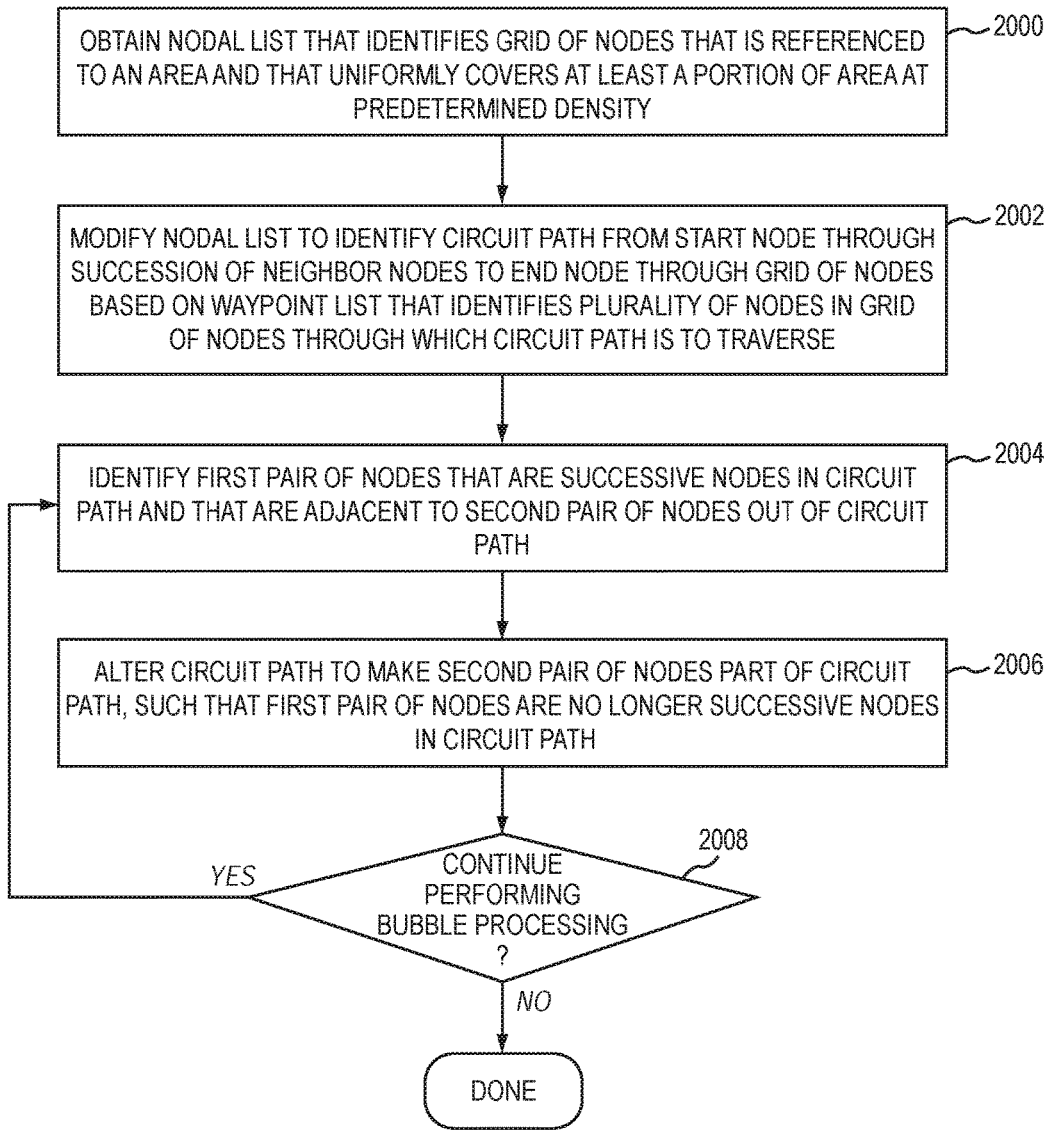
FIG. 11 is a flowchart of a method for making a circuit path according to one embodiment.

FIG. 11 is a flowchart of a method for making the circuit path 98 according to one embodiment. FIG. 11 will be discussed in conjunction with FIGS. 10A and 10B. The computing device 12 obtains a nodal list that identifies the grid of nodes 96 (FIG. 11, block 2000). The nodal list may be formatted substantially similarly, or identically, to the nodal list 74 discussed above with regard to FIG. 8, except that such nodal list would reflect the layout of the grid of nodes 96. The grid of nodes 96 is referenced to an area and uniformly covers at least a portion of the area at a predetermined density.

The computing device 12 modifies the nodal list to identify the circuit path 98 from a start node 96 through a succession of neighbor nodes 96 to an end node 96 based on a waypoint list that identifies a plurality of nodes 96 through which the circuit path 98 is to traverse (FIG. 11, block 2002). The waypoint list may have substantially similar, or identical, fields as the waypoint list 86 discussed above with regard to FIG. 8. The computing device 12 identifies a first pair of nodes 96 that are successive nodes 96 in the circuit path 98 and that are adjacent to a second pair of nodes 96 that are out of the circuit path 98 (FIG. 11, block 2004). The computing device 12 alters the circuit path 98 to make the second pair of nodes 96 part of the circuit path 98, such that the first pair of nodes 96 are no longer successive nodes 96 in the circuit path 98 (FIG. 11, block 2006). The computing device 12 then determines if another iteration of the bubble operation should be performed, or whether bubble processing is complete (FIG. 11, block 2008). The computing device 12 may continue the bubble processing for a predetermined number of iterations, or until a condition in the circuit path 98 is met, such as until no pairs of nodes 96 that are successive nodes in the circuit path 98 are adjacent to a second pair of nodes 96 out of the circuit path 98. Note that even after bubble processing some nodes 96, such as the nodes 96-1-96-4, are unconnected to the circuit path 98. Such nodes may be referred to herein as "orphan" nodes.

Figures 12A, 12B:
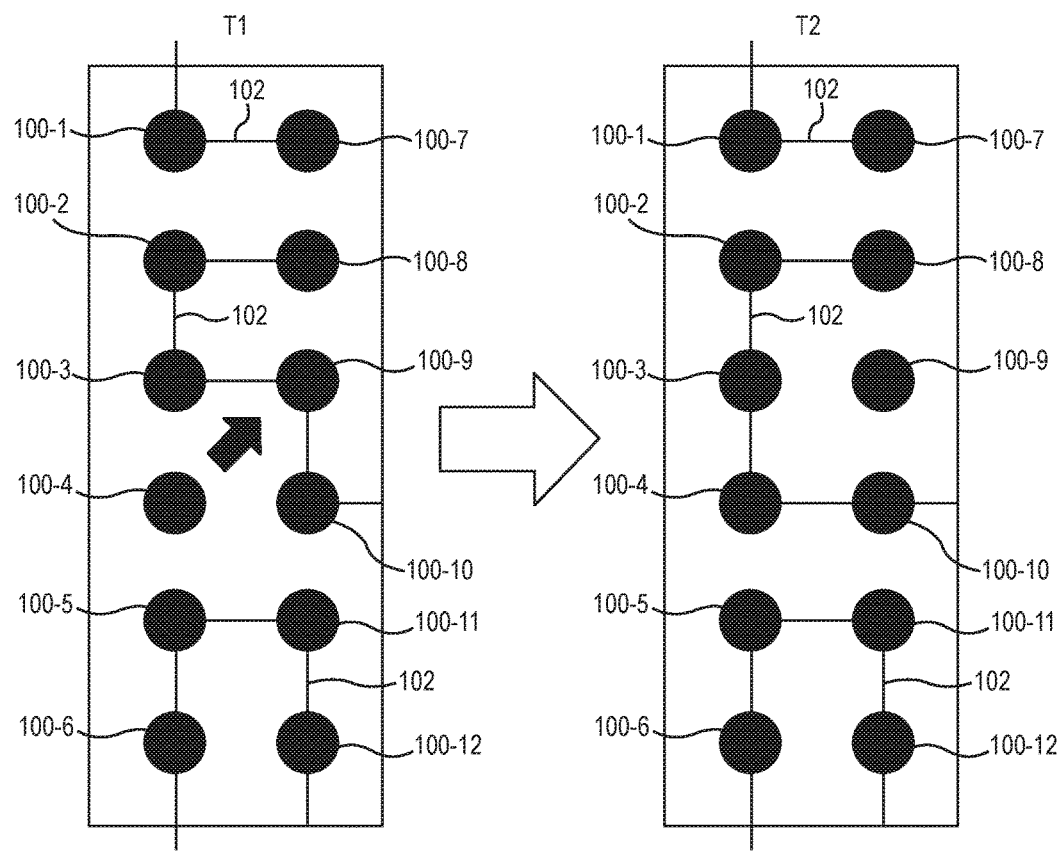
FIG. 12A is a block diagram of a subset of a grid of nodes through which an initial circuit path has been defined.
FIG. 12B is a block diagram of the subset of the grid of nodes illustrated in FIG. 12A at a subsequent point in time after the computing device has iteratively performed a nudge operation on the circuit path according to one embodiment.

FIG. 12A is a block diagram of a subset of a grid of nodes 100 through which an initial circuit path 102 has been defined. FIG. 12B is a block diagram of the subset of the grid of nodes 100 at a subsequent point in time after the computing device 12 has iteratively performed a nudge operation on the circuit path 102. A nudge operation replaces a first node 100 that is in the circuit path 102 with a second (orphan) node 100 that is not in the circuit path 102, such that the first node 100 is no longer in the circuit path 102 and becomes an orphan node.

Referring to FIG. 12A, note that the node 100-4 is an orphan node and is not part of the circuit path 102. At a time T1, the computing device 12 analyzes the nodal list that identifies the nodes 100 and the circuit path 102, and determines that a node 100-9 is cater-corner to the orphan node 100-4 (in a northeast direction), is in the circuit path 102, and is connected via the circuit path 102 to two neighbor nodes 100-3 and 100-10 of the orphan node 100-4. Such conditions mean that the orphan node 100-4 may be swapped with the node 100-9 in a nudge operation. At a time T2, the computing device 12 alters the circuit path 102 to remove the second node 100-9 from the circuit path 102 and to include the orphan node 100-4 in the circuit path 102.

The computing device 12 may perform the nudge operation iteratively, sometimes referred to herein as nudge processing. In some embodiments, the nudge operation may be performed iteratively in a certain direction, such as nudging in northwest, northeast, southwest, or southeast directions. Nudge processing may result in the circuit path 102 being rearranged sufficiently such that bubble processing may again be performed to add orphan nodes 100 to the circuit path 102. Thus, in some embodiments, bubble processing and nudge processing may be iteratively performed, one after the other, multiple times, to reduce or eliminate the number of orphan nodes 100 that are not part of the circuit path 102.

Figure 13A:
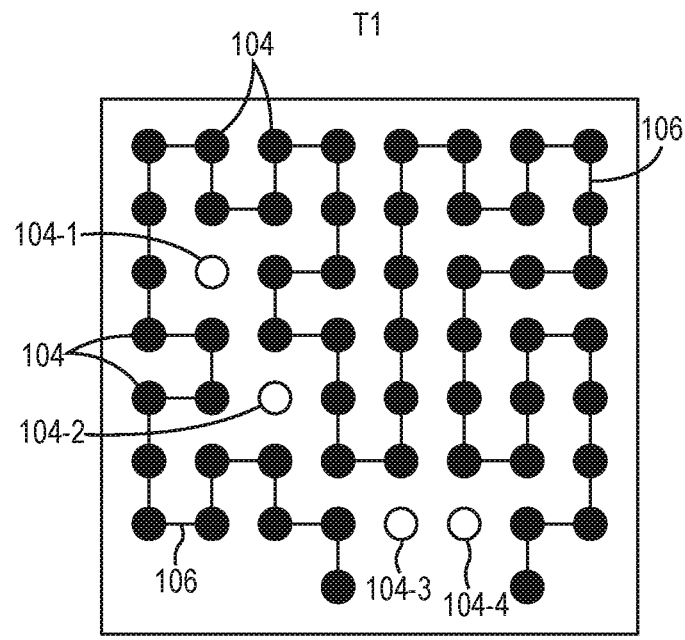
FIGS. 13A-13D are block diagrams that illustrate how iterations of nudge processing and bubble processing can reduce orphan nodes according to one embodiment.
Figure 13B:
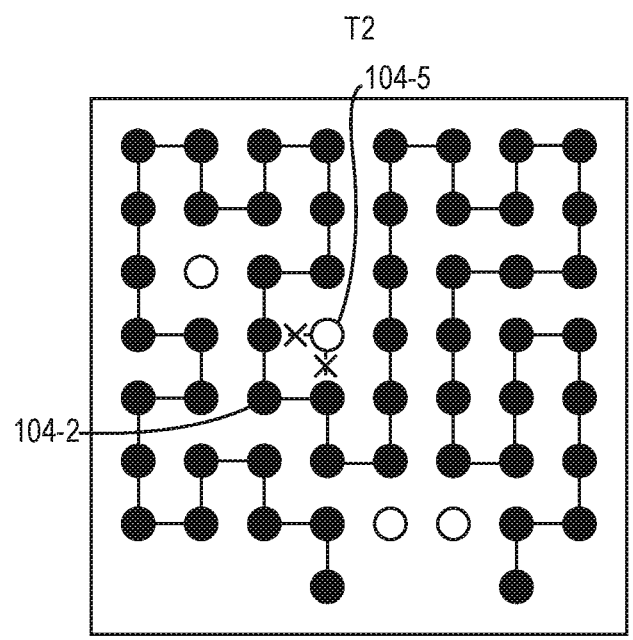
Figure 13C:
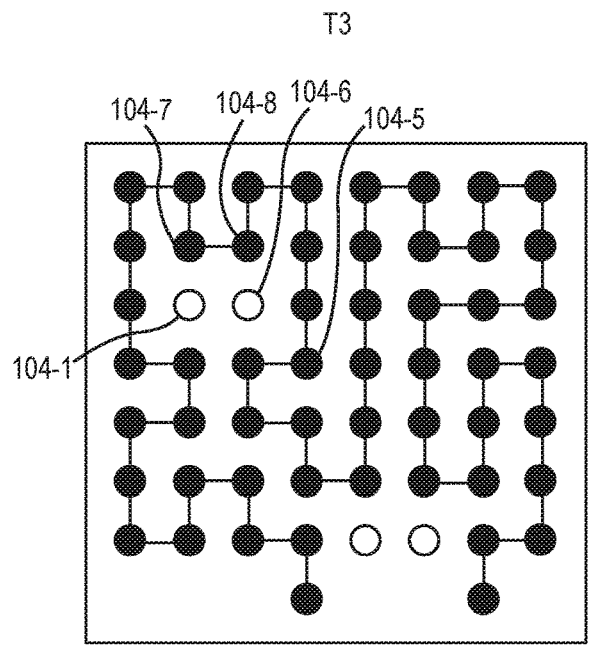
Figure 13D:
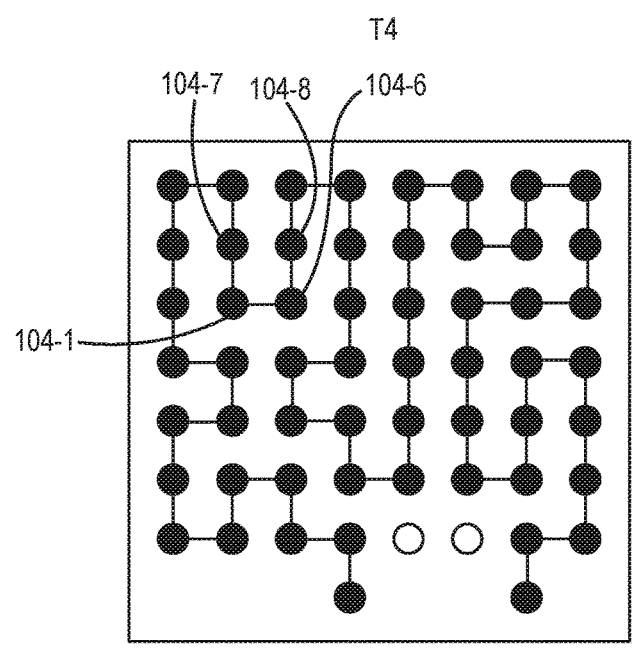

FIGS. 13A-13D are block diagrams that illustrate how iterations of nudge processing and bubble processing can reduce orphan nodes according to one embodiment. FIG. 13A illustrates a grid of nodes 104 at a time T1 after bubble processing has been completed on a circuit path 106. Note that nodes 104-1-104-4 are orphan nodes. FIG. 13B illustrates the grid of nodes 104 at a time T2 after nudge processing has swapped a node 104-5 with the node 104-2, such that the node 104-2 is no longer an orphan node, and the node 104-5 becomes an orphan node. FIG. 13C illustrates the grid of nodes 104 at a time T3 after nudge processing has swapped the node 104-5 with a node 104-6, such that the node 104-5 is no longer an orphan node, and the node 104-6 becomes an orphan node. Note that at time T3, the nodes 104-7 and 104-8 comprise a first pair of nodes 104 that are successive nodes in the circuit path 106, and that are adjacent to a second pair of nodes 104-1, 104-6 that are out of the circuit path 106, and are thus eligible for bubble processing. FIG. 13D illustrates the grid of nodes 104 at a time T4 after the computing device 12 has performed bubble processing to alter the circuit path 106 to make the second pair of nodes 104-1, 104-6 part of the circuit path 106, such that the first pair of nodes 104-7 and 104-8 are no longer successive nodes 104 in the circuit path 106.

While for purposes of illustration, the embodiments have been discussed in conjunction with generating a single circuit path through a grid of nodes, the embodiments are not limited to a single circuit path, and can be utilized to generate any number of intertwined circuit paths that substantially cover an area of an item.

In this regard, it may be desirable in certain embodiments to generate a plurality of separate electrically conductive circuit paths that are in close proximity to one another over substantial portions of the area of the item. Multiple proximal circuit paths spaced closely apart decreases the likelihood that the electrically conductive circuit paths could be circumvented because any attempts at altering a layer of such circuit paths may short, or open, multiple different circuit paths, increasing the likelihood of detection of such an attempted breach.

Figure 14:
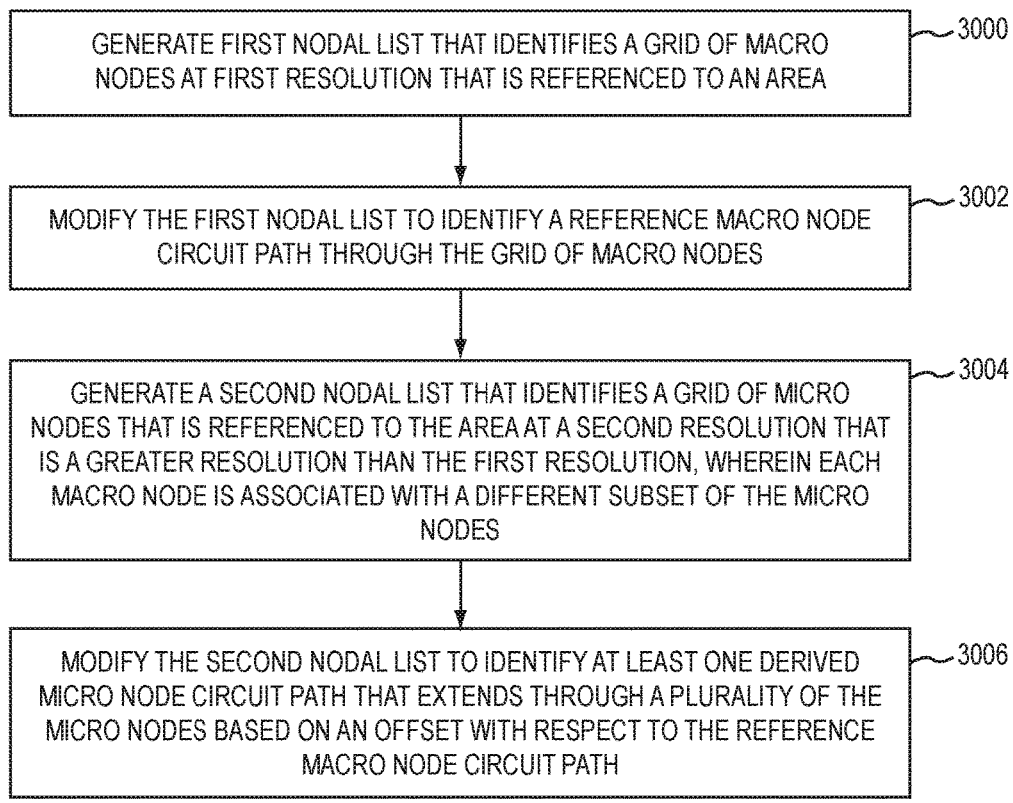
FIG. 14 is a flowchart of a method for generating a plurality of spaced apart circuit paths according to one embodiment.

FIG. 14 is a flowchart of a method for generating a plurality of uniformly spaced circuit paths according to one embodiment. FIG. 14 will be discussed in conjunction with FIG. 1. The computing device 12 (FIG. 1) receives the data 14 that identifies the perimeter 16 of the area 18 of the surface 20 of the item 22. The computing device 12 generates a first nodal list, which, for example, may comprise similar data fields and be formatted substantially similarly to the nodal lists 58, 74, discussed above, and which identifies a grid of macro nodes at a first resolution that is referenced to the area 18 (FIG. 14, block 3000). Each macro node is associated with a particular portion of the area 18. The computing device 12 modifies the first nodal list to identify a reference macro node circuit path through the grid of macro nodes (FIG. 14, block 3002). The computing device 12 generates a second nodal list that identifies a grid of micro nodes that is referenced to the area 18 at a second resolution that is a greater resolution than the first resolution. Each macro node is associated with a different subset of the micro nodes (FIG. 14, block 3004). For example, each macro node is associated with a same portion of the area 18 as the associated subset of micro nodes.

The computing device 12 modifies the second nodal list to identify at least one derived micro node circuit path that extends through a plurality of the micro nodes based on an offset with respect to the reference macro node circuit path (FIG. 14, block 3006). In one embodiment, the reference macro node circuit path may be mapped to micro nodes identified in the second nodal list, and the second nodal list may be modified to identify a micro node circuit path. In other embodiments, the computing device 12 modifies the second nodal list to identify a plurality of derived micro node circuit paths that extend through a plurality of the micro nodes based on an offset with respect to the reference macro node circuit path.

The multiple micro node circuit paths maintain a same respective distance from each other along the length of the micro node circuit paths. Because the respective inter-circuit path distance may be relatively small, such as 6 microns for example, the embodiments facilitate the placement of a plurality of electrically conductive circuit paths in close proximity to one another that interweaves across the area 18, and greatly decreases a likelihood of successfully bypassing the multiple circuit paths in order to access underlying circuit board components.

For purposes of illustration, the method illustrated in FIG. 14 has been discussed in a sequence wherein the first nodal list that identifies the grid of macro nodes at a first (lower) resolution is generated first, and then the second nodal list that identifies the micro nodes at a second (greater) resolution is generated second. However, the embodiments are not limited to that particular sequence, and the second nodal list that identifies the micro nodes at the second (greater) resolution may first be generated, followed by the generation of the first nodal list that identifies the grid of macro nodes at the first (lower) resolution. In one particular embodiment wherein the area 18 may include one or more openings, as discussed above, the second nodal list that identifies the micro nodes at the second (greater) resolution is generated first. The first nodal list is then generated second, but no macro nodes are identified in the first nodal list for any portion of the area 18 in which an opening, or a portion thereof, exists. Such portions of the area 18 thus may not initially be covered by the initial generation of circuit paths, but may ultimately be covered after subsequent bubble and/or nudge processing occurs.

Figure 15:
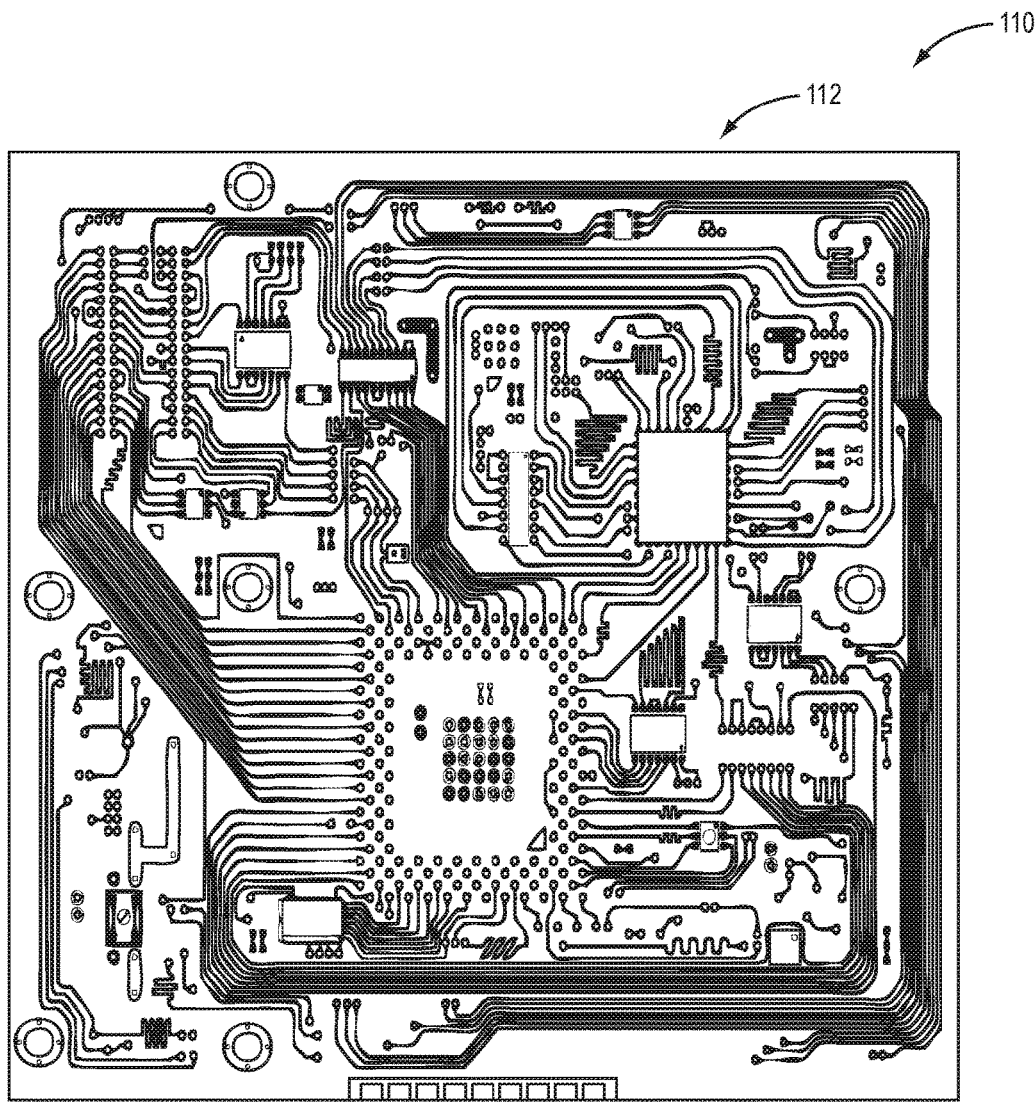
FIG. 15 is a diagram of an example item that comprises a printed circuit board.

FIG. 15 is a diagram of an example item 110 that comprises a printed circuit board. In this example, the data 14 may comprise information that identifies a perimeter of the item 110, or may comprise an image of the item 110, along with information suitable for determining an area 112 of the item 110. For example, the image may comprise a particular pixel resolution, with each pixel comprising a known height and width.

Figure 16:
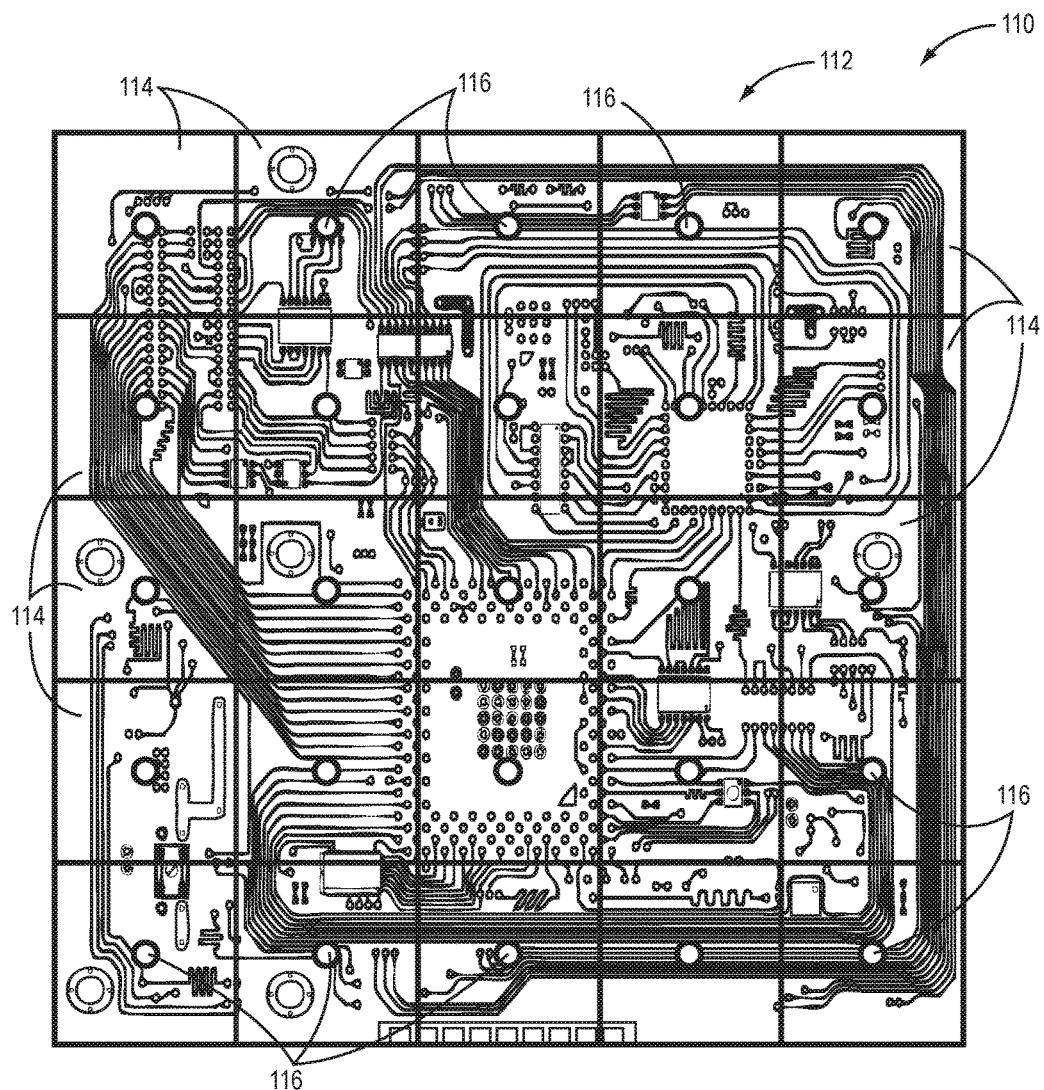
FIG. 16 is a block diagram illustrating a grid of macro nodes at a first resolution referenced to an area of the item illustrated in FIG. 14.

FIG. 16 is a block diagram illustrating a grid of macro nodes 114 at a first resolution referenced to the area 112. In this example, there are 25 macro nodes 114. Each macro node 114 is associated with a different portion of the area 112. The particular size of each macro node 114 may be application dependent, and may differ based on a desired number of derived micro node circuit paths, a width of such derived micro node circuit paths, and an inter-circuit path distance from one another. In some embodiments, each macro node 114 is sized such that the desired number of derived micro node circuit paths can pass through a single macro node 114, but each macro node 114 is no larger than the width and inter-path distance between such derived micro node circuit paths such that the first resolution is as great as possible. A greater resolution of macro nodes 114 may facilitate more complex circuit path patterns.

FIG. 16 also illustrates a plurality of reference locations 116 that are within respective macro nodes 114. In this example, the reference locations 116 are located at a center of the corresponding macro nodes 114, but the embodiments are not limited to reference locations that are located at the center of macro nodes. However, as will be discussed in greater detail below, locating the reference locations 116 at the center of the respective macro nodes 114 may facilitate the determination of a maximum number of derived micro node circuit paths.

Figure 17:
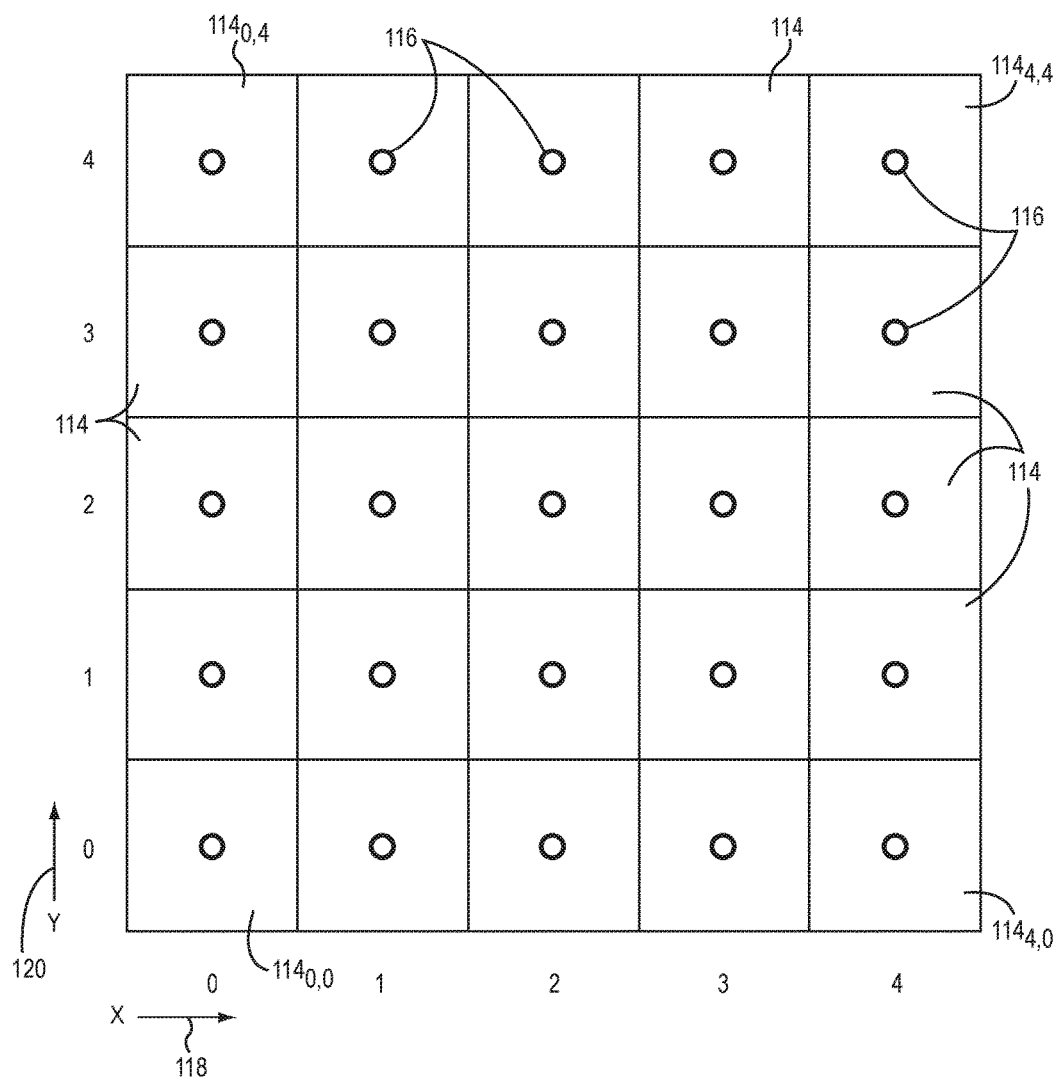
FIG. 17 is a block diagram illustrating the grid of macro nodes illustrated in FIG. 16, and reference locations within such macro nodes according to one embodiment.

FIG. 17 is a block diagram illustrating the grid of macro nodes 114 and reference locations 116. The macro nodes 114 may be identified based on respective locations along an X-axis 118 and a Y-axis 120. Solely for purposes of illustration and convenience, the X-axis 118 and Y-axis 120 are shown as having an origin at the bottom left corner of the grid of macro nodes 114, but, as illustrated above for example, the location of the origin is arbitrary and could be located at any corner of the grid of macro nodes 114. Particular macro nodes 114 will be identified hereinafter using the element reference numeral 114 and the subscript that identifies the particular X,Y location of the macro node 114 along the X-axis 118 and the Y-axis 120, respectively. For example, the macro node $114_{0,0}$ identifies the macro node 114 that is located at the bottom left corner of the grid of macro nodes 114.

Initially, a macro node waypoint list is generated that identifies a plurality of macro nodes 114 in the grid of macro nodes 114 through which the reference macro node circuit path is to traverse. The macro node waypoint list may be input by an operator, or may be determined by the computing device 12 without user input. In one embodiment, the computing device 12 may define the macro node waypoint list by identifying the four corner macro nodes $114_{0,0}$, $114_{0,4}$, $114_{4,4}$, and $114_{4,0}$, in order for the circuit generation process to initially identify a macro node circuit path that extends along a perimeter of the grid of macro nodes 114. For purposes of illustration, assume that the initial macro node waypoint list identifies a start macro node 114 as the macro node $114_{0,0}$, followed by macro nodes $114_{0,4}$, $114_{4,4}$, and ending with an end macro node $114_{4,0}$, such that the macro node waypoint list comprises the following entries:

[$114_{0,0}$, $114_{0,4}$, $114_{4,4}$, $114_{4,0}$].

Figure 18:
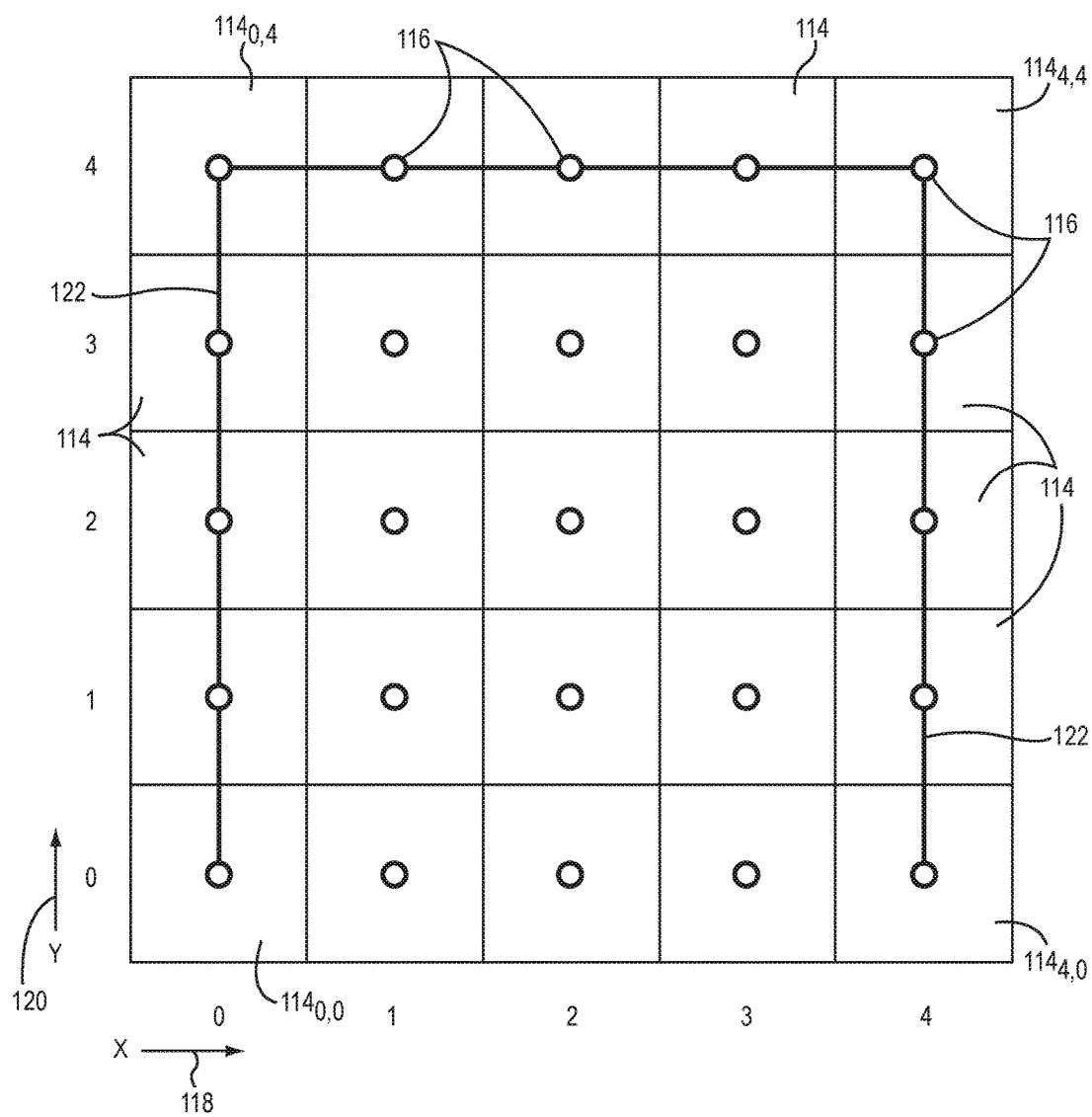
FIG. 18 is a block diagram illustrating the grid of macro nodes with a reference macro node circuit path that may be identified in a first nodal list based on a macro node waypoint list.

FIG. 18 is a block diagram illustrating the grid of macro nodes 114 with a reference macro node circuit path 122 that may be identified in the first nodal list based on the macro node waypoint list. The reference macro node circuit path 122 may be determined, for example, in the same or substantially the same manner as discussed above with regard to FIG. 8, for example. After the initial reference macro node circuit path 122 is determined, bubble processing, such as described above with reference to FIGS. 9, 10A, and 10B, may be iteratively performed on the reference macro node circuit path 122.

Figure 19:
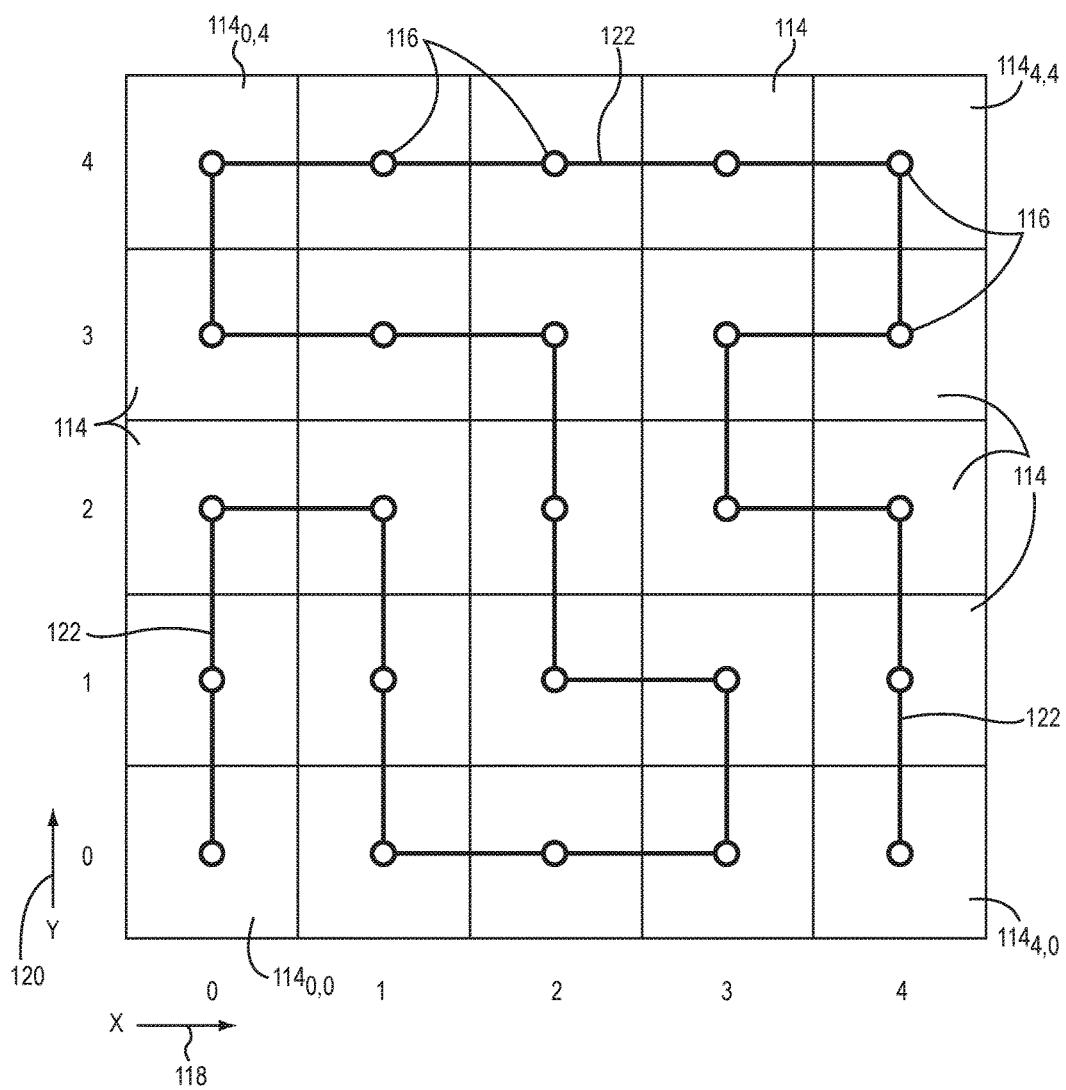
FIG. 19 is a block diagram illustrating the reference macro node circuit path that is identified in the first nodal list after bubble processing has been iteratively performed according to one embodiment.

FIG. 19 is a block diagram illustrating the reference macro node circuit path 122 that is identified in the first nodal list after bubble processing has been iteratively performed, according to one embodiment. In this example, all the macro nodes 114 in the grid of macro nodes 114 are in the reference macro node circuit path 122, but in other examples, it may also be desirable to perform nudge processing on the reference macro node circuit path 122, as discussed in FIGS. 13A-13D above.

Figure 20:
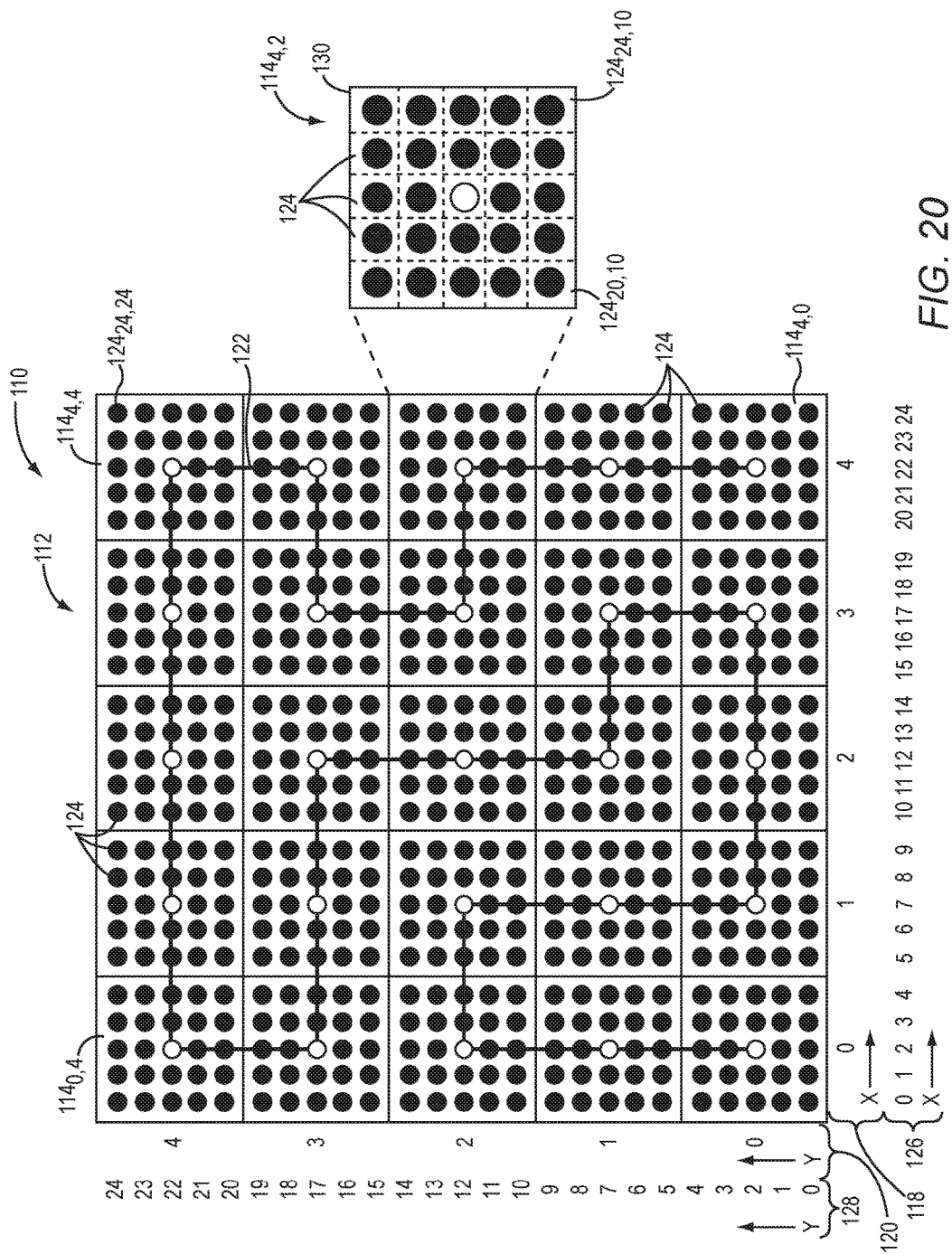
FIG. 20 is a block diagram illustrating a grid of micro nodes at a second resolution that is referenced to an area of an item according to one embodiment.

FIG. 20 is a block diagram illustrating a grid of micro nodes 124 at a second resolution that is referenced to the area 112 of the item 110. The micro nodes 124 are identified in a second nodal list (not illustrated), that may comprise similar data fields and be formatted substantially similarly to the nodal lists 58, 74, discussed above. In this example, the resolution of the grid of micro nodes 124 is 25 times greater than the resolution of the grid of macro nodes 114, but the particular resolution of the micro nodes 124 to the macro nodes 114 may be application specific, and, as discussed above, may be determined based at least in part on a desired number of derived micro node circuit paths, a width of such derived micro node circuit paths, and an inter-circuit path distance from one another. For purposes of discussion, two coordinate systems will be used to discuss particular macro nodes 114 and particular micro nodes 124. The X-axis 118 and Y-axis 120, discussed above, will be utilized to discuss the macro nodes 114, and are defined in units of macro nodes 114. An X-axis 126 and a Y-axis 128 will be utilized to discuss the micro nodes 124, and are defined in units of micro nodes 124. Thus, particular micro nodes 124 will be identified hereinafter using the element reference numeral 124 and the subscript that identifies the particular X,Y location (coordinate) of the micro node 124 along the X-axis 126 and the Y-axis 128, respectively. For example, the micro node $124_{24,24}$ identifies the micro node 124 that is located in the top right corner of the grid of micro nodes 124. The macro node $114_{0,0}$ identifies the macro node 114 that is located at the bottom left corner of the grid of macro nodes 114.

As illustrated, each macro node 114 is associated with a different subset of the micro nodes 124. For example, the macro node $114_{4,4}$ is associated with the 25 micro nodes 124 located in the upper most right corner of grid of micro nodes 124, bounded by the micro nodes $124_{20,20}$, $124_{20,24}$, $124_{24,24}$, and $124_{24,20}$. Thus the macro node $114_{4,4}$ and such 25 micro nodes 124 are referenced to the same portion of the area 112. For purposes of illustration, the micro nodes 124 are shown as circular shapes, but in other embodiments, as illustrated in inset 130, the micro nodes 124 may be considered to be rectangular, and be immediately adjacent one another. Thus, the circular shapes may be considered solely as illustrating a center location of such micro nodes 124. In some embodiments, the micro nodes 124 may be based on smaller elements, such as pixels, associated with an image of the item 110. Thus, while offset operations and calculations discussed below are discussed in terms of micro nodes 124, it will be apparent that all such operations and calculations could be scaled, based on a particular underlying pixel resolution associated with an image of the item 110. Moreover, the micro nodes 124 may be wider than the conductive circuit paths that are ultimately generated based on derived micro node circuit paths, such that even though the micro nodes 124 are adjacent to one another as illustrated in the inset 130, such conductive paths if placed down the center of the micro nodes 124 have a desired inter-path gap, such as 3-6 microns, in some embodiments.

The reference macro node circuit path 122 is illustrated as mapping to a plurality of micro nodes 124. While this will ease the subsequent discussion of determining derived circuit paths, in other embodiments the reference macro node circuit path 122 may not map precisely down the center of the micro nodes 124. In such embodiments, it will be appreciated that additional offsets may be determined to simplify the determination of derived micro circuit paths based on the reference macro node circuit path 122.

Figure 21:
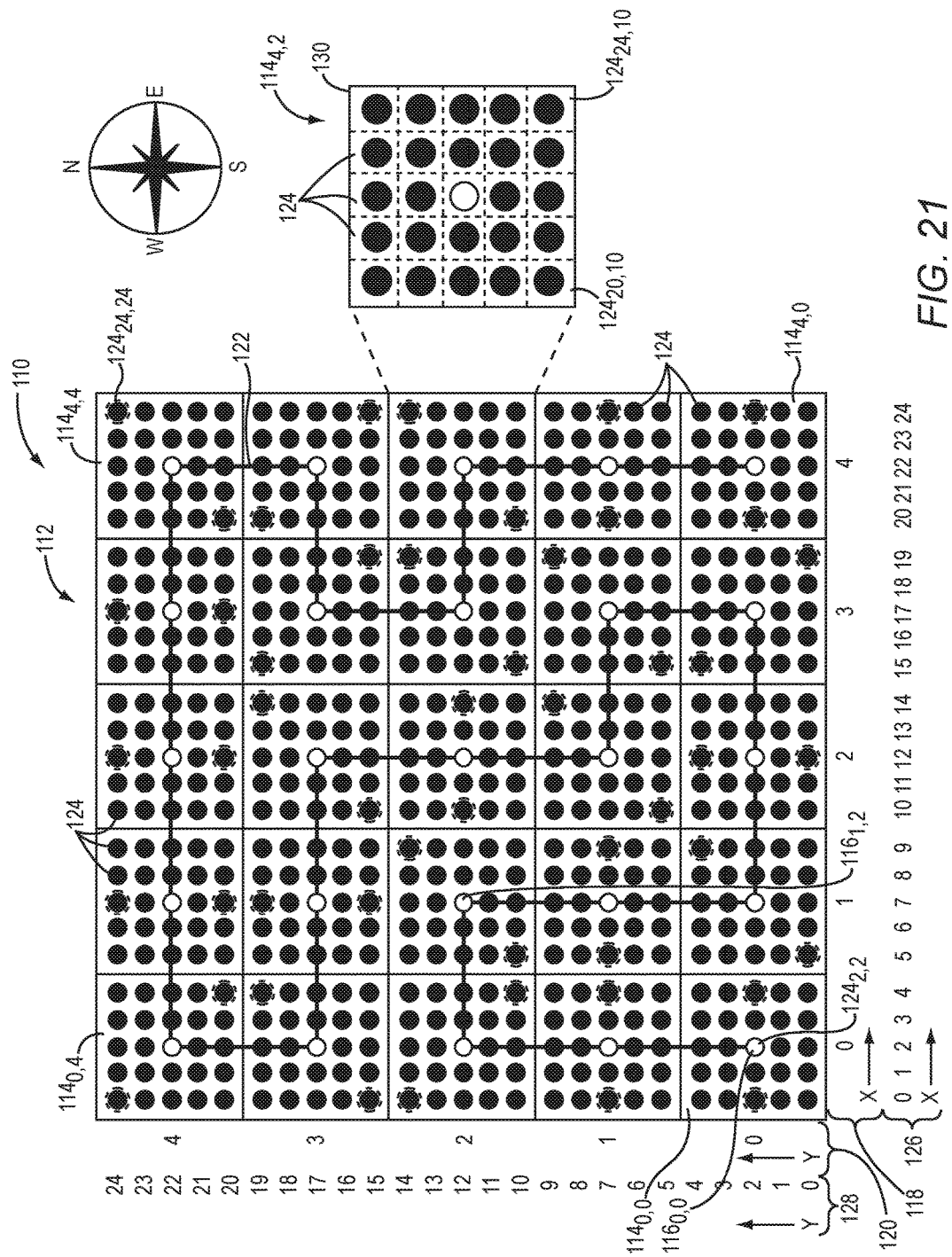
FIG. 21 is a block diagram illustrating the micro nodes illustrated in FIG. 20 depicting micro nodes that may be identified in two micro node waypoint lists, according to one embodiment.

In some embodiments, one or more micro node waypoint lists are determined based on the reference macro node circuit path 122, and the second nodal list is modified to identify one or more derived micro node circuit paths based on the one or more micro node waypoint lists. In this regard, FIG. 21 is a block diagram of the micro nodes 124 that illustrates a plurality of micro nodes 124 that may be identified in two micro node waypoint lists suitable for generating derived micro node circuit paths that extend parallel to the reference macro node circuit path 122, that maintain a same distance from each other, and that are based on an offset with respect to the reference macro node circuit path 122.

In this embodiment, the reference macro node circuit path 122 itself may be mapped to respective micro nodes 124 to generate a micro node circuit path that may be utilized to generate a conductive circuit path. In this example, it will be assumed that three micro node circuit paths are desired, that the reference macro node circuit path 122 can be mapped to respective micro nodes 124 to identify one of such three micro node circuit paths, and thus that the reference macro node circuit path 122 will be used to derive two micro node circuit paths. However, the number of derived micro node circuit paths is not limited to two, and may comprise any number of micro node circuit paths.

Figure 22A:
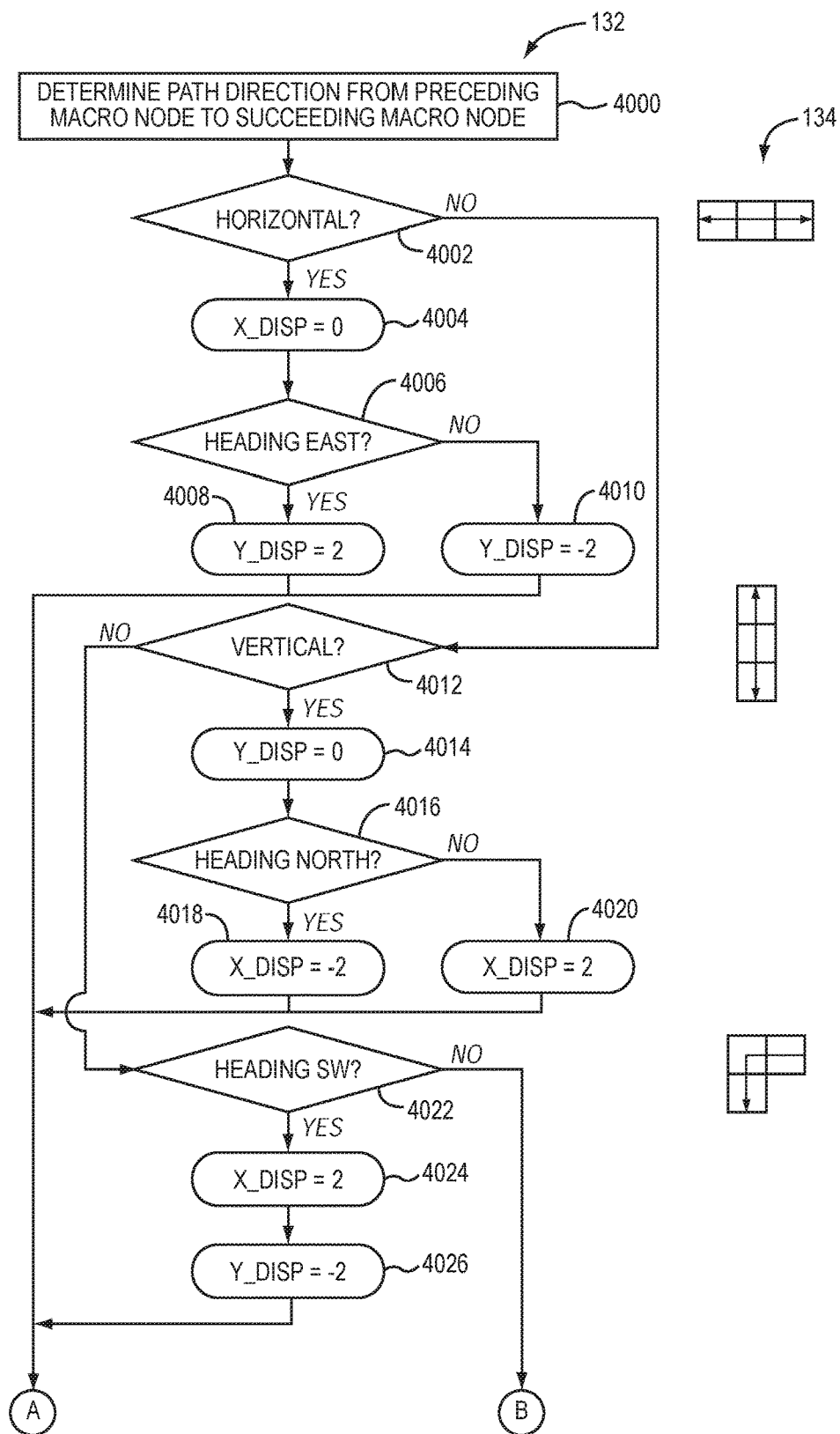
FIGS. 22A-22B illustrate a flowchart for generating waypoint lists according to one embodiment.
Figure 22B:
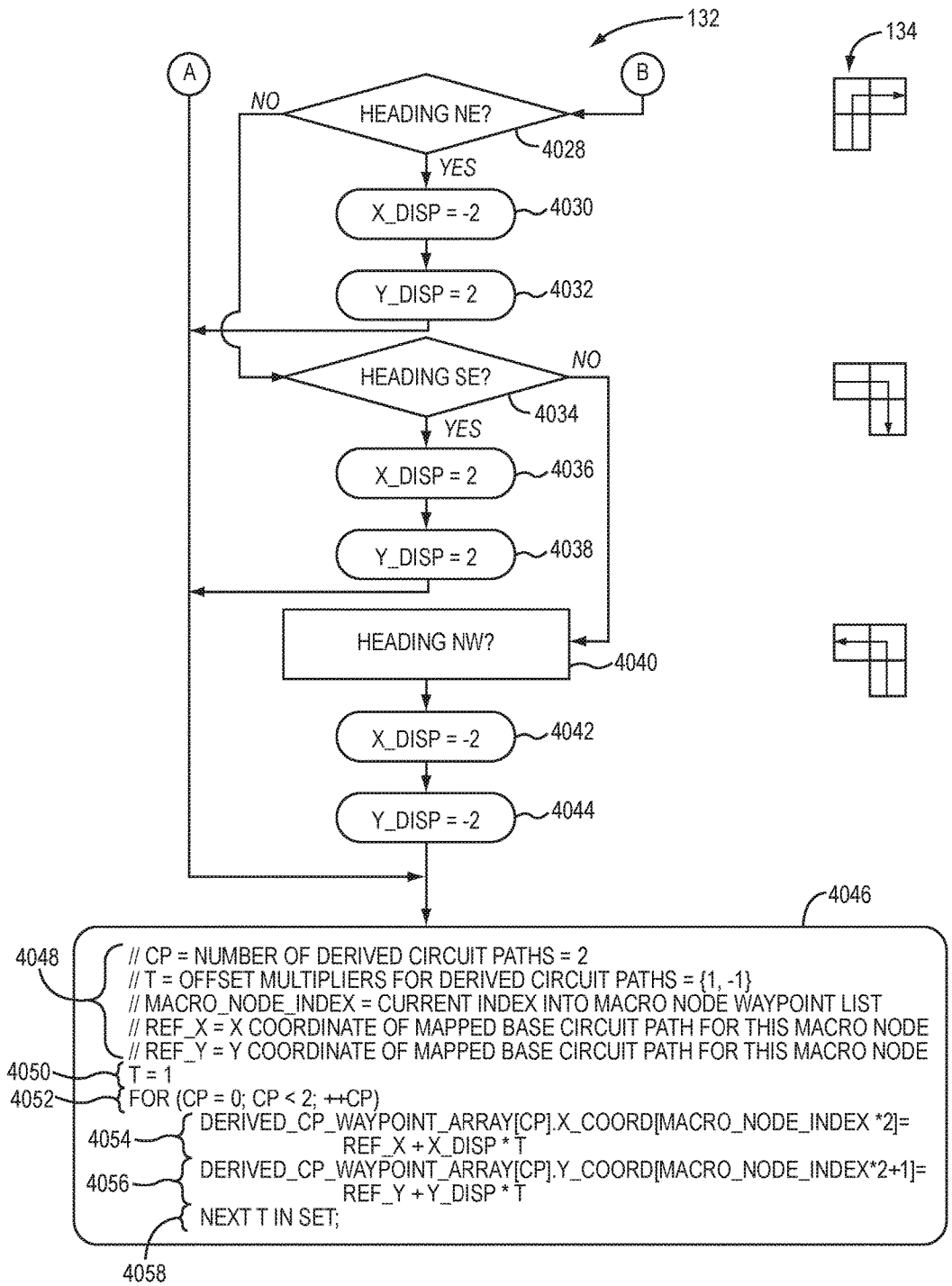

FIGS. 22A-22B illustrate a flowchart 132 for generating waypoint lists according to one embodiment. The waypoint lists may be used to derive micro node circuit paths that extend through a plurality of micro nodes 124 based on an offset with respect to the reference macro node circuit path 122, according to one embodiment. FIGS. 22A-22B will be discussed with reference to FIG. 21. The process described in the flowchart 132 is performed for each macro node 114 identified in the reference macro node circuit path 122. One goal of the process is to determine X and Y offsets with respect to a reference location of the respective macro node 114. In this example, the reference locations comprise the reference locations 116, which coincide with both the center of the respective macro node 114, as well as a particular micro node 124, due to the resolution of the micro nodes 124. The X and Y offsets are, in this embodiment, in terms of a number of micro nodes 124, in this example either 0, 2, or −2, as discussed in greater detail below. Particular reference locations 116 will be identified hereinafter using the element reference numeral 116 and the subscript that identifies the particular X,Y location (coordinates) of the macro node 114 with which the reference location 116 is associated. For example, the reference location $116_{0,0}$ is associated with the macro node $114_{0,0}$.

Each reference location 116 can be relatively easily mapped to a particular micro node 124 simply by multiplying the X and Y coordinates of the macro node 114 in which the reference location 116 is located by the number of micro nodes 124 per macro node 114 in the X and Y directions, and adding a constant offset. In the example illustrated in FIG. 21, this can be accomplished in the following manner:

mapped micro node X coordinate=X coordinate of macro node 114×5 (i.e., the number of micro nodes per macro node in the X direction)+2; and mapped micro node Y coordinate=Y coordinate of macro node 114×5 (i.e., the number of micro nodes per macro node in the Y direction)+2.

As an example, the reference location $116_{0,0}$ of the macro node $114_{0,0}$ maps to the micro node $124_{2,2}$, in the following manner:

mapped micro node X coordinate=0*5+2=2; and
mapped micro node Y coordinate=0*5+2=2.

The process described in the flowchart 132 starts with the first macro node 114 identified in the reference macro node circuit path 122, which, in this example, is the macro node $114_{0,0}$. The process first determines a direction of the reference macro node circuit path 122 based on both a preceding macro node 114 to a succeeding macro node 114. Solely for purposes of illustration, each direction will be identified as either north (the direction toward the top of FIG. 21), south (the direction toward the bottom of FIG. 21), east (the direction toward the right of FIG. 21), west (the direction toward the left of FIG. 21), northeast (NE) (between north and east), northwest (NW) (between north and west), southeast (SE) (between south and east) or southwest (SW) (between south and west). The first macro node $1140_{,0}$ may be treated as an exception since there is no preceding macro node $1140_{,0}$. Assume for purposes of illustration that it is assumed that the reference macro node circuit path 122 initially starts in a vertical direction heading north. Thus, for the macro node $1140_{,0}$ it is determined that the reference macro node circuit path 122 is heading north (FIG. 22A, block 4000). For purposes of convenience, FIGS. 22A-22B contain a plurality of insets 134 that illustrate potential directions of the reference macro node circuit path 122 in proximity to blocks of the flowchart 132 that are performed for such directions.

Generally, blocks 4002-4010 are performed if the reference macro node circuit path 122 is heading in an east or west (horizontal) direction; blocks 4012-4020 are performed if the reference macro node circuit path 122 is heading in a north or south (vertical) direction; blocks 4022-4026 are performed if the reference macro node circuit path 122 is heading in a southwest direction; blocks 4028-4032 are performed if the reference macro node circuit path 122 is heading in a northeast direction; blocks 4034-4038 are performed if the reference macro node circuit path 122 is heading in a southeast direction; and blocks 4040-4044 are performed if the reference macro node circuit path 122 is heading in a northwest direction.

For the macro node $1140_{,0}$, blocks 4012-4020 are performed because it was determined that the reference macro node circuit path 122 was heading in a north (vertical) direction, as discussed above. The Y_DISP (i.e., Y coordinate offset) is set to a value of 0 (FIG. 22A, block 4014). It is then determined if the reference macro node circuit path 122 is heading north (FIG. 22A, block 4016). In this example, because the reference macro node circuit path 122 is heading north, the X_DISP (i.e., X coordinate offset) is set to a value of −2. Processing then branches to block 4046, which contains instructions that determine which particular micro nodes 124 should be added to the two waypoint lists from which the two derived micro node circuit paths will be generated.

Comment 4048 identifies variables utilized in the various calculations. The variable CP contains the number of derived micro node circuit paths, which is in this example is two. The variable T is a set of offset multipliers used to sweep across a macro node 114 to identify the appropriate micro nodes 124 for addition to the waypoint lists. In this example, the set contains the values 1 and −1, but the particular values may differ depending on the number of derived micro node circuit paths and the desired distances between such derived micro node circuit paths and the reference macro node circuit path 122. The variable MACRO_NODE_INDEX is a current index into the macro node waypoint list. The variable MACRO_NODE_INDEX starts at 0 and is incremented by a value of 1 each time the process in the flowchart 132 is processed. For the first iteration of the process, in this example, because the macro node waypoint list is 0 relative, the value of the variable MACRO_NODE_INDEX is 0. The variable REF_X is the X coordinate of the micro node 124 to which the reference location 116 of the current macro node 114 being processed is mapped. In this example, the reference location $116_{0,0}$ is mapped to the micro node $124_{2,2}$, as discussed above, and thus the variable REF_X has a value of 2. The variable REF_Y is the Y coordinate of the micro node 124 to which the reference location 116 of the current macro node 114 being processed is mapped. In this example, the reference location 116$_{0,0}$ is mapped to the micro node 124$_{2,2}$, and thus the variable REF_Y has a value of 2.

Instruction 4050 sets the variable T to the first value in the set, which, as discussed above, is a value of 1. Instruction 4052 is a loop instruction that starts a processing loop, and sets the variable CP to a value of 0 for the first iteration of the loop. Instruction 4054 indexes a two dimensional array referred to as DERIVED_CP_WAYPOINT_ARRAY with the variable CP. This identifies which of the two micro node waypoint lists is being altered. Each particular DERIVED_CP_WAYPOINT_ARRAY array comprises two arrays, an X_COORD array that stores the X coordinates of the micro nodes 124 identified to be added to the micro node waypoint list, and a Y_COORD array that stores the Y coordinates of the micro nodes 124 identified to be added to the micro node waypoint list. The X coordinate of the micro node 124 is identified via the following formula:

REF_X+X_DISP*T.

In this example, as discussed above, REF_X has a value of 2; X_DISP has a value of −2; and T has a value of 1. Thus, the X coordinate is identified as 2+−2*1=0.

Instruction 4056 sets the Y coordinate array in a similar fashion. The Y coordinate of the micro node 124 is identified via the following formula:

REF_Y+Y_DISP*T.

In this example, as discussed above, REF_Y has a value of 2; Y_DISP has a value of 0; and T has a value of 1. Thus, the Y coordinate is identified as 2+0*1=2. Thus, the micro node 124$_{0,2}$ is identified as the first micro node 124 in the first waypoint list.

Instruction 4058 sets the variable T to the next value in the set, in this example, −1. Instruction 4052 increments the value of CP to a value of 1. Instruction 4054 now accesses the second micro node waypoint list by virtue of the variable CP being set to a value of 1, and identifies the X coordinate via the following formula:

REF_X+X_DISP*T.

In this example, as discussed above, REF_X has a value of 2; X_DISP has a value of −2; and T now has a value of −1. Thus, the X coordinate is identified as 2+−2*−1=4.

Instruction 4054 sets the Y coordinate array in a similar fashion. The Y coordinate of the micro node 124 is identified via the following formula:

REF_Y+Y_DISP*T.

In this example, as discussed above, REF_Y has a value of 2; Y_DISP has a value of 0; and T has a value of −1. Thus, the Y coordinate is identified as 2+0*−1=2. Thus, the micro node 124$_{4,2}$ is identified as the first micro node 124 in the second waypoint list.

The MACRO_NODE_INDEX is then incremented by 1, and the process described in the flowchart 132 is repeated. In this manner, for each macro node 114 in the reference macro node circuit path 122, one micro node 124 is added to each micro node waypoint list.

As another example, the flowchart 132 will be discussed in conjunction with the fourth macro node 114 in the reference macro node circuit path 122. The fourth macro node 114 is the macro node 114$_{1,2}$. The MACRO_NODE_INDEX has a value of 3, and thus the process described by the flowchart 132 had previously been performed three times. The path direction of reference macro node circuit path 122 is determined based on the preceding macro node 114$_{0,2}$ and the succeeding macro node 114$_{1,2}$ (FIG. 22A, block 4000). In one embodiment, this can be determined by comparing the X and Y coordinates of the preceding macro node 114$_{0,2}$ to the X and Y coordinates of the succeeding macro node 114$_{1,2}$. In this example, the direction is determined to be southeast, and thus processing continues to blocks 4034-4038. The X_DISP variable is set to a value of 2 and the Y_DISP variable is set to a value of 2 (FIG. 22B, blocks 4036-4038). At block 4046, the value of MACRO_NODE_INDEX is 3. The value of REF_X is 7, and the value of REF_Y is 12, identifying the micro node 124$_{7,12}$ as the micro node 124 to which the reference location 116$_{1,2}$ maps.

Instruction 4054 sets the X coordinate of the next micro node 124 in the first waypoint list via the following formula:

REF_X+X_DISP*T.

In this example, as discussed above, REF_X has a value of 7; X_DISP has a value of 2; and T has a value of 1. Thus, the X coordinate is identified as 7+2*1=9.

Instruction 4056 sets the Y coordinate array in a similar fashion. The Y coordinate of the micro node 124 is identified via the following formula:

REF_Y+Y_DISP*T.

In this example, as discussed above, REF_Y has a value of 12; Y_DISP has a value of 2; and T has a value of 1. Thus, the Y coordinate is identified as 12+2*1=14. Thus, the micro node 124$_{9,14}$ is identified as the fourth micro node 124 in the first waypoint list.

Instruction 4058 sets the variable T to the next value in the set, in this example, −1. Instruction 4052 increments the value of CP to a value of 1. Instruction 4054 now accesses the second micro node waypoint list by virtue of the variable CP being set to a value of 1, and identifies the X coordinate via the following formula:

REF_X+X_DISP*T.

In this example, as discussed above, REF_X has a value of 7; X_DISP has a value of 2; and T now has a value of −1. Thus, the X coordinate is identified as 7+2*−1=5.

Instruction 4054 sets the Y coordinate array in a similar fashion. The Y coordinate of the micro node 124 is identified via the following formula:

REF_Y+Y_DISP*T.

In this example, as discussed above, REF_Y has a value of 12; Y_DISP has a value of 2; and T has a value of −1. Thus, the Y coordinate is identified as 12+2*−1=10. Thus, the micro node 124$_{5,10}$ is identified as the fourth micro node 124 in the second waypoint list.

FIG. 21 identifies in dashed circular outline the micro nodes 124 that are ultimately identified on respective micro node waypoint lists based on the flowchart 132 for each macro node 114. Table 1, below, also identifies such micro nodes 124 (columns 3 and 4), corresponding macro nodes 114 (column 1), and the micro node 124 that corresponds to the reference location 116 associated with the respective macro node 114 (column 2).

TABLE 1

| (Column 1) MACRO NODE CP | (Column 2) REFERENCE MICRO NODE CP | (Column 3) FIRST MICRO NODE WAYPOINT LIST | (Column 4) SECOND MICRO NODE WAYPOINT LIST |
|---|---|---|---|
| 0,0 | 2,2 | 0,2 | 4,2 |
| 0,1 | 2,7 | 0,7 | 4,7 |
| 0,2 | 2,12 | 0,14 | 4,10 |
| 1,2 | 7,12 | 9,14 | 5,10 |
| 1,1 | 7,7 | 9,7 | 5,7 |
| 1,0 | 7,2 | 9,4 | 5,0 |
| 2,0 | 12,2 | 12,4 | 12,0 |
| 3,0 | 17,2 | 15,4 | 19,0 |
| 3,1 | 17,7 | 15,5 | 19,9 |
| 2,1 | 12,7 | 10,5 | 14,9 |
| 2,2 | 12,12 | 10,12 | 14,12 |
| 2,3 | 12,17 | 10,15 | 14,19 |
| 1,3 | 7,17 | 7,15 | 7,19 |
| 0,3 | 2,17 | 0,15 | 4,19 |
| 0,4 | 2,22 | 0,24 | 4,20 |
| 1,4 | 7,22 | 7,24 | 7,20 |
| 2,4 | 12,22 | 12,24 | 12,20 |
| 3,4 | 17,22 | 17,24 | 17,20 |
| 4,4 | 22,22 | 24,24 | 20,20 |
| 4,3 | 22,17 | 24,15 | 20,19 |
| 3,3 | 17,17 | 19,15 | 15,19 |
| 3,2 | 17,12 | 19,14 | 15,10 |
| 4,2 | 22,12 | 24,14 | 20,10 |
| 4,1 | 22,7 | 24,7 | 20,7 |
| 4,0 | 22,2 | 24,2 | 20,2 |

In the process described above, each micro node waypoint list includes one micro node 124 for each macro node 114. However, in some embodiments, such micro node waypoint lists can be reduced to include only the starting micro node 124, intermediate micro nodes 124 in which a change in direction occurs, and the ending micro node 124. In such embodiments, the micro node waypoint lists identified in Table 1 can be reduced in size as illustrated in Table 2, below.

TABLE 2

| FIRST MICRO NODE WAYPOINT LIST | SECOND MICRO NODE WAYPOINT LIST |
|---|---|
| 0,2 | 4,2 |
| 0,14 | 4,10 |
| 9,14 | 5,10 |
| 9,4 | 5,0 |
| 15,4 | 19,0 |
| 15,5 | 19,9 |
| 10,5 | 14,9 |
| 10,15 | 14,19 |
| 0,15 | 4,19 |
| 0,24 | 4,20 |
| 24,24 | 20,20 |
| 24,15 | 20,19 |
| 19,15 | 15,19 |
| 19,14 | 15,10 |
| 24,14 | 20,10 |
| 24,2 | 20,2 |

Figure 23:
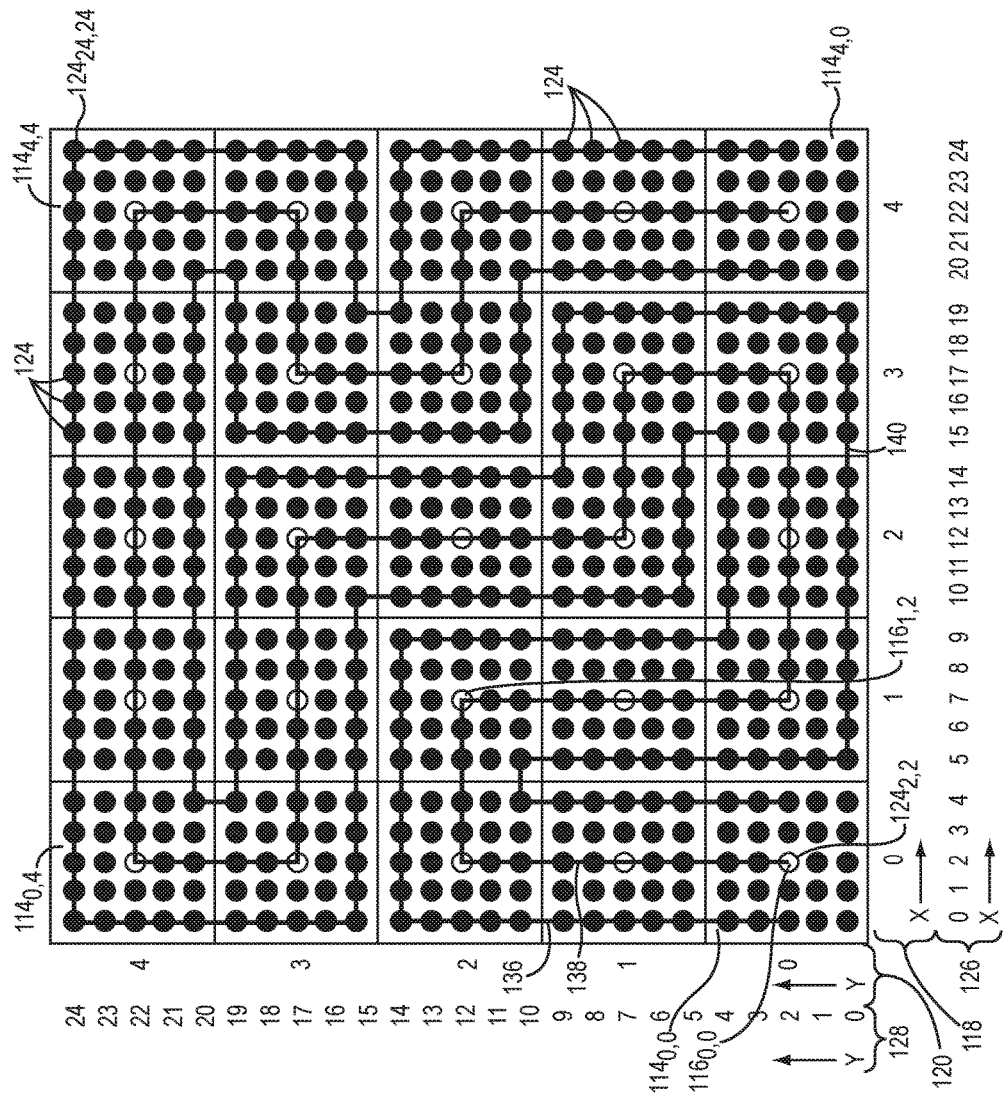
FIG. 23 is a block diagram of three micro node circuit paths according to one embodiment.

The first and second micro node waypoint lists can then be used to alter the second nodal list to define multiple micro node circuit paths, in accordance, for example, with the circuit generation processes described above with regard to FIG. 8. FIG. 23 is a block diagram of the micro nodes 124, and three micro node circuit paths 136, 138, and 140. The micro node circuit path 136 was derived from the first micro node waypoint list described above with regard to FIGS. 21 and 22A-B, the micro node circuit path 138 was generated by mapping the reference macro node circuit path 122 to corresponding micro nodes 124, and the micro node circuit path 140 was derived from the second micro node waypoint list described above. As illustrated, all three micro node circuit paths 136, 138, 140 extend along a parallel path, and remain a fixed nodal distance from one another. If desired, bubble processing may then be performed on each micro node circuit path 136, 138, 140. The three micro node circuit paths 136, 138, 140 may then be electrically coupled to edge connectors to facilitate connection to one or more electronic components. In some embodiments, during the initial generation of the micro nodes and the macro nodes, portions of the area 18 to which the micro nodes and the macro nodes are referenced that are near the ends of the micro node circuit paths 136, 138, 140 may be "blocked out" such that the micro node circuit paths 136, 138, 140 are not permitted to extend into such portions. This may be done to ensure that sufficient space is available for connecting the micro node circuit paths 136, 138, 140 to edge connectors and/or electronic components. In one embodiment, such portions are merely not identified in the first and second nodal lists.

Figure 24:
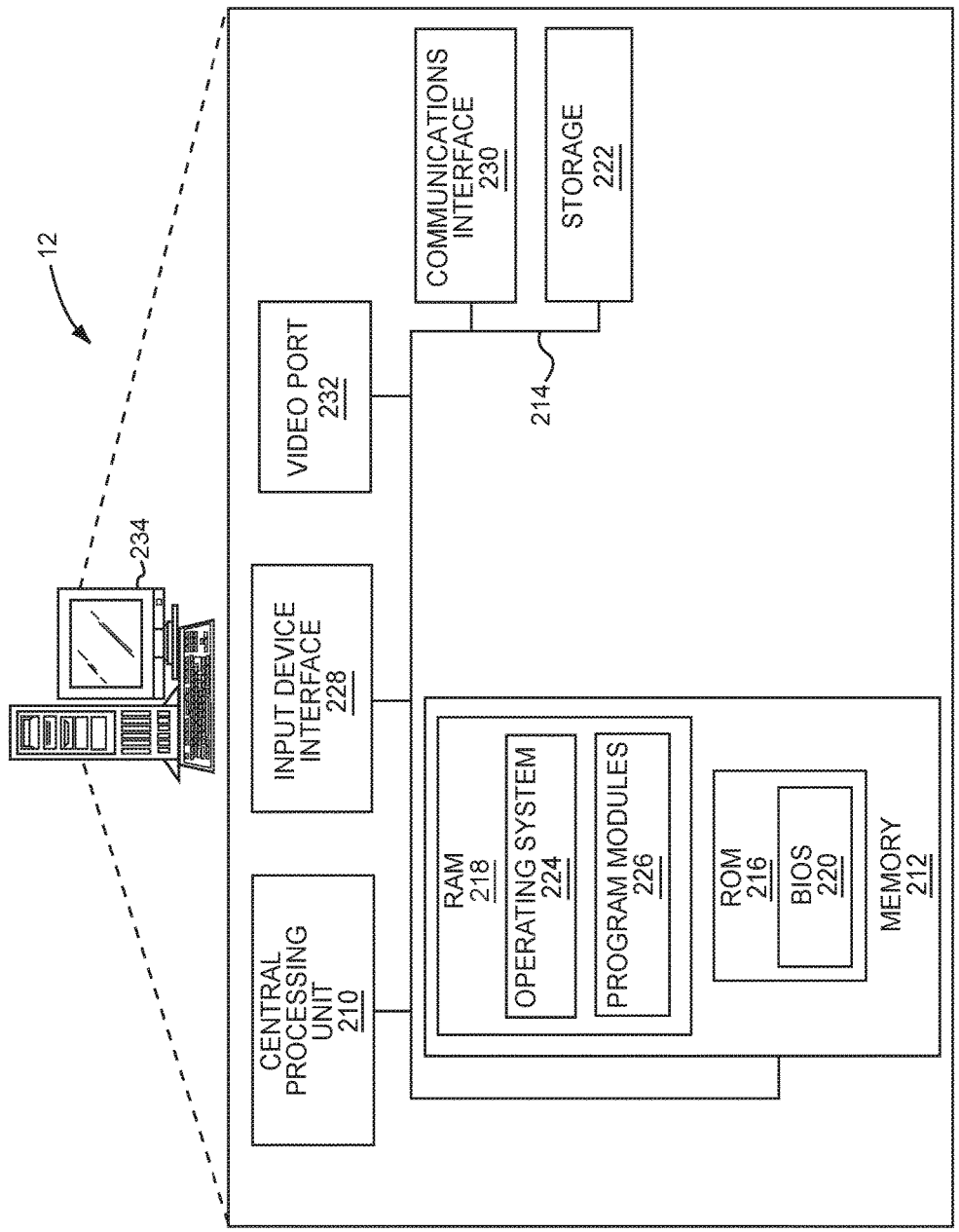
FIG. 24 is a block diagram of the computing device according to one embodiment.

FIG. 24 is a block diagram of the computing device 12 according to one embodiment. The computing device 12 may comprise any computing or processing device capable of including firmware, hardware, and/or executing software instructions to implement the functionality described herein, such as a laptop or desktop computer, or a special purpose computing device having primary functionality for implementing the embodiments described herein. The computing device 12 includes a central processing unit 210, a system memory 212, and a system bus 214. The system bus 214 provides an interface for system components including, but not limited to, the system memory 212 and the central processing unit 210. The central processing unit 210 can be any commercially available or proprietary processor.

The system bus 214 may be any of several types of bus structures that may further interconnect to a memory bus (with or without a memory controller), a peripheral bus, and/or a local bus using any of a variety of commercially available bus architectures. The system memory 212 may include non-volatile memory 216 (e.g., read only memory (ROM), erasable programmable read only memory (EPROM), electrically erasable programmable read only memory (EEPROM), etc.) and/or volatile memory 218 (e.g., random access memory (RAM)). A basic input/output system (BIOS) 220 may be stored in the non-volatile memory 216, and can include the basic routines that help to transfer information between elements within the computing device 12. The volatile memory 218 may also include a high-speed RAM, such as static RAM for caching data.

The computing device 12 may further include or be coupled to a computer-readable storage 222, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 222 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the embodiments.

A number of modules can be stored in the computer-readable storage 222 and in the volatile memory 218, including an operating system 224 and one or more program modules 226, which may implement the functionality described herein in whole or in part, including, for example, initial nodal list generation, circuit path generation, bubble processing, nudge processing, and any other functionality described herein.

All or a portion of the embodiments may be implemented as a computer program product stored on a transitory or non-transitory computer-usable or computer-readable storage medium, such as the computer-readable storage 222, which includes complex programming instructions, such as complex computer-readable program code, configured to cause the central processing unit 210 to carry out the steps described herein. Thus, the computer-readable program code can comprise software instructions for implementing the functionality of the embodiments described herein when executed on the central processing unit 210. The central processing unit 210, in conjunction with the program modules 226 in the volatile memory 218, may serve as a controller for the computing device 12 that is configured to, or adapted to, implement the functionality described herein.

An operator may be able to enter one or more configuration commands through a keyboard (not illustrated), a pointing device such as a mouse (not illustrated), or a touch-sensitive surface (not illustrated). Such input devices may be connected to the central processing unit 210 through an input device interface 228 that is coupled to the system bus 214, but can be connected by other interfaces such as a parallel port, an Institute of Electrical and Electronic Engineers (IEEE) 1394 serial port, a Universal Serial Bus (USB) port, an infrared (IR) interface, and the like.

The computing device 12 may also include a communications interface 230, suitable for communicating with a network as appropriate or desired. The communications interface 230 may also be configured to communicate with a circuit generation apparatus which, given a circuit path identified in a nodal list, may be configured to generate a conductive circuit that corresponds to the identified circuit path. The computing device 12 may also include a video port 232 configured to interface with a display 234.

Those skilled in the art will recognize improvements and modifications to the preferred embodiments of the disclosure. All such improvements and modifications are considered within the scope of the concepts disclosed herein and the claims that follow.

What is claimed is:

1. A method for generating a nodal list, comprising:
    obtaining, by a computing device comprising a processor, data that identifies a perimeter of an area of a surface;
    identifying, by the computing device, a plurality of sub-areas within the area;
    generating, by the computing device, a nodal list that identifies a grid of nodes that is referenced to the area and that uniformly covers the area outside of the plurality of sub-areas at a predetermined density, wherein the grid of nodes comprises a plurality of node-free zones, each node-free zone being coextensive with a corresponding sub-area, wherein for each respective node, the nodal list identifies each neighbor node of the respective node;
    modifying, by the computing device, the nodal list to identify a circuit path through the grid of nodes from a start node through a succession of neighbor nodes to an end node based on a waypoint list that identifies a subset of nodes in the grid of nodes through which the circuit path is to traverse; and
    fabricating a conductive circuit based on the circuit path.

2. The method of claim 1, wherein at least one sub-area of the plurality of sub-areas corresponds to a component on the surface or a thermal hot-spot of the surface.

3. The method of claim 1, wherein each respective node is a predetermined distance from each neighbor node.

4. The method of claim 3, wherein the predetermined distance is about 6 microns.

5. The method of claim 1, wherein each respective node has a maximum of four neighbor nodes.

6. The method of claim 1 further comprising:
    for each of a plurality of iterations, performing a bubble operation comprising:
        identifying a first pair of nodes that are successive nodes in the circuit path and that are adjacent to a second pair of nodes out of the circuit path; and
        altering the circuit path to make the second pair of nodes part of the circuit path, such that the first pair of nodes are no longer successive nodes in the circuit path.

7. The method of claim 6, wherein the bubble operation is iteratively repeated until no pair of nodes that are successive nodes in the circuit path are adjacent to another pair of nodes out of the circuit path.

8. The method of claim 6, wherein identifying the first pair of nodes that are successive nodes in the circuit path comprises:
    randomly selecting a node that is in the circuit path; and
    determining that the node and a successive node in the circuit path are adjacent to another pair of nodes out of the circuit path.

9. The method of claim 1 further comprising:
    generating a macro nodal list that identifies a macro grid of nodes that is referenced to the area and that uniformly covers the area outside of the plurality of sub-areas at a different predetermined density, the macro nodal list having a lower nodal resolution than the nodal list, each node in the macro grid of nodes being associated with a different subset of the nodes in the nodal list.

10. A system, comprising:
    a computing device comprising:
        a memory; and
        a processor coupled to the memory and configured to:
            obtain data that identifies a perimeter of an area of a surface;
            identify a plurality of sub-areas within the area;
            generate a nodal list that identifies a grid of nodes that is referenced to the area and that uniformly covers the area outside of the plurality of sub-areas at a predetermined density, wherein the grid of nodes comprises a plurality of node-free zones, each node-free zone being coextensive with a corresponding sub-area, wherein for each respective node, the nodal list identifies each neighbor node of the respective node; and
            modify the nodal list to identify a circuit path through the grid of nodes from a start node through a succession of neighbor nodes to an end node based on a waypoint list that identifies a subset of nodes in the grid of nodes through which the circuit path is to traverse; and
    a circuit generation apparatus configured to:
        fabricate a conductive circuit based on the circuit path.

11. The system of claim 10, wherein at least one sub-area of the plurality of sub-areas corresponds to a component on the surface or a thermal hot-spot of the surface.

12. The system of claim 10, wherein each respective node is a predetermined distance from each neighbor node.

13. The system of claim 12, wherein the predetermined distance is about 6 microns.

14. The system of claim 10, wherein each respective node has a maximum of four neighbor nodes.

15. The system of claim 10 wherein the processor is further configured to:
for each of a plurality of iterations, perform a bubble operation comprising:
identifying a first pair of nodes that are successive nodes in the circuit path and that are adjacent to a second pair of nodes out of the circuit path; and
altering the circuit path to make the second pair of nodes part of the circuit path, such that the first pair of nodes are no longer successive nodes in the circuit path.

16. The system of claim 15, wherein the processor is further configured to iteratively repeat the bubble operation until no pair of nodes that are successive nodes in the circuit path are adjacent to another pair of nodes out of the circuit path.

17. The system of claim 15, wherein to identify the first pair of nodes that are successive nodes in the circuit path, the processor is further configured to:
randomly select a node that is in the circuit path; and
determine that the node and a successive node in the circuit path are adjacent to another pair of nodes out of the circuit path.

18. A method for generating a nodal list, comprising:
obtaining, by a computing device comprising a processor, data that identifies a perimeter of an area of a surface;
identifying at least one sub-area within the area;
generating, by the computing device, a nodal list that identifies a grid of nodes that is referenced to the area and that uniformly covers the area outside of the at least one sub-area at a predetermined density, wherein the grid of nodes comprises a node-free zone that is coextensive with the at least one sub-area, wherein for each respective node, the nodal list identifies each neighbor node of the respective node; and
generating a macro nodal list that identifies a macro grid of nodes that is referenced to the area and that uniformly covers the area outside of the at least one sub-area at a different predetermined density, the macro nodal list having a lower nodal resolution than the nodal list, each node in the macro grid of nodes being associated with a different subset of the nodes in the nodal list; and
fabricating a conductive circuit based on a circuit path that traverses through at least some of the nodes in the grid of nodes.

\* \* \* \* \*